United States Patent
Liu

(10) Patent No.: US 9,225,984 B2
(45) Date of Patent: Dec. 29, 2015

(54) SIMPLIFICATION OF LM MODE

(71) Applicant: Futurewei Technologies, Inc., Plano, TX (US)

(72) Inventor: Lingzhi Liu, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 469 days.

(21) Appl. No.: 13/749,439

(22) Filed: Jan. 24, 2013

(65) Prior Publication Data

US 2013/0188705 A1 Jul. 25, 2013

Related U.S. Application Data

(60) Provisional application No. 61/590,016, filed on Jan. 24, 2012.

(51) Int. Cl.
| | |
|---|---|
| *H04N 7/26* | (2006.01) |
| *H04N 19/50* | (2014.01) |
| *H04N 19/593* | (2014.01) |
| *H04N 19/186* | (2014.01) |
| *H04N 19/42* | (2014.01) |

(52) U.S. Cl.
CPC ....... *H04N 19/00569* (2013.01); *H04N 19/186* (2014.11); *H04N 19/42* (2014.11); *H04N 19/50* (2014.11); *H04N 19/593* (2014.11)

(58) Field of Classification Search
CPC .......... H04N 19/00569; H04N 19/186; H04N 19/42; H04N 19/50; H04N 19/593; H04N 19/00315; H04N 19/00478; H04N 19/00763
USPC ...................................... 375/240.12
See application file for complete search history.

(56) References Cited

U.S. PATENT DOCUMENTS

| | | | | |
|---|---|---|---|---|
| 2008/0089417 | A1* | 4/2008 | Bao et al. | 375/240.16 |
| 2008/0152000 | A1* | 6/2008 | Kaushik | 375/240.03 |
| 2009/0226082 | A1* | 9/2009 | Li | 382/162 |
| 2011/0026820 | A1 | 2/2011 | Strom et al. | |
| 2011/0255591 | A1* | 10/2011 | Kim et al. | 375/240.02 |
| 2013/0272396 | A1* | 10/2013 | Liu | 375/240.12 |

OTHER PUBLICATIONS

Chen, J., et al., "Chroma Intra Prediction by Reconstructed Luma Samples," JCTVC-C206, Joint Collaborative Team on Video Coding (JCT-VC) of ITU-T SG16 WP3 and ISO/IEC JTC1/SC29/WG11,3rd meeting, Guangzhou, China, Oct. 7-15, 2010, 7 pages.

Kim, J., et al., "New Intra Chroma Prediction Using Inter-channel Correlation," JCTVC-B021, Joint Collaborative Team on Video Coding (JCT-VC) of ITU-T SG16 WP3 and ISO/IEC JTC1/SC29/WG11, 2nd Meeting, Geneva, Switzerland, Jul. 21-28, 2010, 9 pages.

(Continued)

*Primary Examiner* — Jorge L Ortiz Criado
*Assistant Examiner* — Yong Joon Kwon
(74) *Attorney, Agent, or Firm* — Conley Rose, P.C.; Grant Rodolph; Adam J. Stegge

(57) ABSTRACT

A video codec comprising a processor computing an average of a plurality of reconstructed chroma samples located in neighboring blocks of a chroma block and adjacent to the chroma block, computing an intermediate variable by applying an integer function on the average of the reconstructed chroma samples, and generating a predicted chroma sample for the chroma block based on the intermediate variable.

24 Claims, 4 Drawing Sheets

(56) References Cited

OTHER PUBLICATIONS

Liu, L., et al., "Non-CE6a: Reduce the Look-up Table Entries for LM Mode Calculation," JCTVC-H0490, Joint Collaborative Team on Video Coding (JCT-VC) of ITU-T SG16 WP3 and ISO/IEC JTC1/SC29/WG11, San Jose, California, Feb. 1-10, 2012, 4 pages.

Liu, L., et al., "Non-CE6a: Remove the Large Multiplier for LM Mode Calculation," JCTVC-H0491, Joint Collaborative Team on Video Coding (JCT-VC) of ITU-T SG16 WP3 and ISO/IEC JTC1/SC29/WG11, San Jose, California, Feb. 1-10, 2012, Version 1, 3 pages.

Liu, L., et al., "Non-CE6a: Remove the Large Multiplier for LM Mode Calculation," JCTVC-H0491, Joint Collaborative Team on Video Coding (JCT-VC) of ITU-T SG16 WP3 and ISO/IEC JTC1/SC29/WG11, San Jose, California, Feb. 1-10, 2012, Version 2, 9 pages.

Foreign Communication From A Counterpart Application, PCT Application PCT/US2013/022995, International Search Report dated Apr. 29, 2013, 6 pages.

Foreign Communication From A Counterpart Application, PCT Application PCT/US2013/022995, Written Opinion dated Apr. 29, 2013, 11 pages.

Chen, J., et al., "CE6.a.4: Chroma Intra Prediction by reconstructed Luma Samples," JCTVC-E266, JCT-VC of ITU-T SG 16 WP3 and ISO/IEC JTC1/SC29/WG11, 5th Meeting, Geneva, Switzerland, Mar. 16-23, 2011, 10 pages.

Bross, B., et al., "WD5: Working Draft 5 of High-Efficiency Video Coding," JCTVC-G1103 d6, JCT-VC of ITU-T SG 16 WP3 and ISO/IEC JTC1/SC29/WG11, 7th Meeting, Geneva, Switzerland, Nov. 21-30, 2011, 237 pages.

Bossen, F., "Common Test Conditions and Software Reference Configurations," JCTVC-G1200, JCT-VC of ITU-T SG 16 WP3 and ISO/IEC JTC1/SC29/WG11, 7th Meeting, Geneva, Switzerland, Nov. 21-30, 2011, 4 pages.

\* cited by examiner

SIMPLIFICATION OF LM MODE

CROSS-REFERENCE TO RELATED APPLICATIONS

The present application claims priority to U.S. Provisional Patent Application No. 61/590,016 filed Jan. 24, 2012 by Lingzhi Liu and entitled "Simplification of LM Mode", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunication networks. Video compression devices often use software and/or hardware at the source to code the video data prior to transmission, thereby decreasing the quantity of data needed to represent digital video images. The compressed data is then received at the destination by a video decompression device that decodes the video data. Due to limited network resources, it is desirable to develop compression and decompression techniques that increase compression ratios and/or reducing implementation complexity without substantially sacrificing image quality.

SUMMARY

In one embodiment, the disclosure includes a video codec comprising a processor configured to compute an average of a plurality of reconstructed chroma samples located in neighboring blocks of a chroma block and adjacent to the chroma block, compute an intermediate variable by applying an integer function on the average of the reconstructed chroma samples, and generate a predicted chroma sample for the chroma block based on the intermediate variable.

In another embodiment, the disclosure includes a method of video coding comprising computing an average of a plurality of reconstructed chroma samples located in neighboring blocks of a chroma block and adjacent to the chroma block, computing an intermediate variable by applying an integer function on the average of the reconstructed chroma samples, and generating a predicted chroma sample for the chroma block based on the intermediate variable.

In yet another embodiment, the disclosure includes an apparatus comprising a processor configured to generate a prediction block for a chroma block, wherein the prediction block comprises a predicted chroma sample, and wherein generating the prediction block comprises computing a sum of a plurality of reconstructed chroma samples located in neighboring blocks of the chroma block and adjacent to the chroma block, computing an intermediate variable based on the sum and using an integer function selectable from the group consisting of a rounding function and a flooring function, and generating a predicted chroma sample in the prediction block using the intermediate variable.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
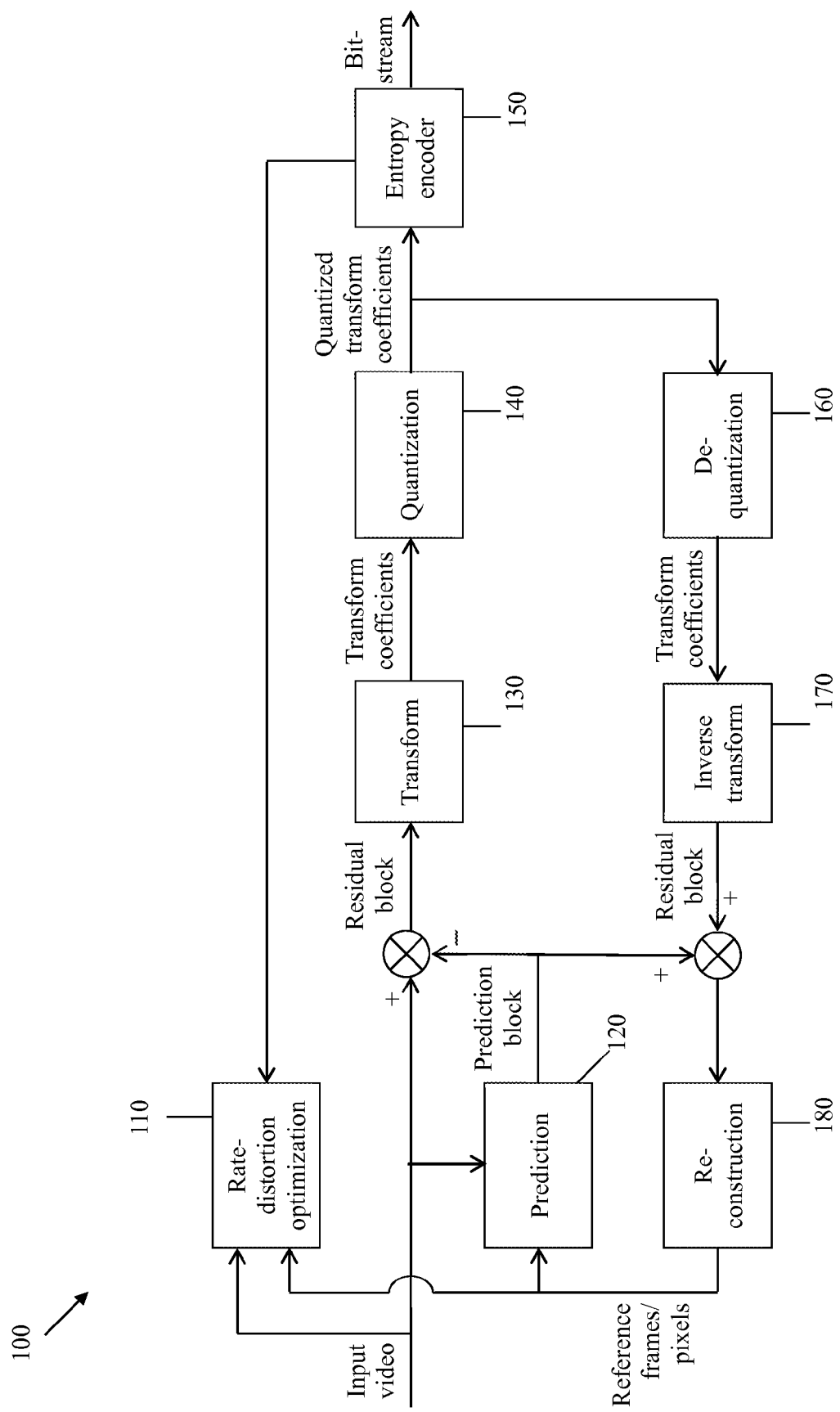
FIG. 1 is a schematic diagram of an embodiment of a video encoding system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . , 255) that represents an image quality or color at the corresponding reference point. The color space may be represented by three components including a luminance (luma, or Y) component and two chrominance (chroma) components, denoted as Cb and Cr (or sometimes as U and V). A luma or chroma integer value is typically stored and processed in binary form using bits. The number of bits used to indicate a luma or chroma value may be referred to as a bit depth or color depth.

In use, an image or video frame may comprise a large amount of pixels (e.g., 2,073,600 pixels in a 1920×1080 frame), thus it may be cumbersome and inefficient to encode and decode (generally referred to hereinafter as code) each pixel independently. To improve coding efficiency, a video frame is usually broken into a plurality of rectangular blocks or macroblocks, which may serve as basic units of processing such as coding, prediction, transform, and quantization. For example, a typical N×N block may comprise $N^2$ pixels, where N is an integer greater than one and is often a multiple of four. In the YUV or YCbCr color space, each luma (Y) block corresponds to two chroma blocks including a Cb block and a Cr block. The Cb block and Cr block also correspond to each other. The chroma blocks and their corresponding luma block are may be located in a same relative position of a video frame, slice, or region.

In video coding, various sampling rates may be used to code the YCbCr components. The size of a Cb block, its corresponding Cr block, and/or its corresponding Y block may be the same or different depending on a sampling rate. For example, in a 4:2:0 sampling rate, each N×N chroma (Cb or Cr) block may correspond to a 2N×2N luma block. In this case, a width or height of the chroma block is half that of the corresponding luma block. The chroma components are downsampled or subsampled, since human eyes may be less sensitive to chroma components than to the luma component. For another example, in a 4:4:4 sampling rate, each N×N chroma (Cb or Cr) block may correspond to an N×N luma block. In this case, higher video fidelity may be preserved, but more data may need to be coded. Other sampling rates, such as 4:2:2, 4:2:1, etc., may also be used.

A block in a video frame may be spatially correlated with other blocks within the same frame such that pixel values across some blocks may vary only slightly and/or exhibit repetitious textures. Modern methods of video-compression exploit these spatial correlations using various techniques which may be known collectively as intra-frame prediction (or in short as intra prediction). When coding a current block using intra prediction, a prediction block or prediction unit is generated based on one or more previously coded reference blocks. The prediction block may be an estimated version of the current block. A residual block may be generated by subtracting the current block from the prediction block, or vice versa, which represents prediction residuals or errors. Since an amount of data needed to represent the prediction residuals may typically be less than an amount of data needed to represent the original block, the residual block may be coded instead of the current block to achieve a higher compression ratio.

Intra prediction may be implemented by a video encoder or decoder (generally referred to herein as a codec). In the encoder, a residual block generated by intra prediction may be transformed, quantized, and scanned before being included into an encoded data stream. Upon reception of the encoded data stream, a decoder may add a reconstructed residual block to an independently generated prediction block to recreate the current block. Although the recreated current block may be an imperfect version of the original current block, e.g., due to quantization, their differences may be hardly perceptible to the human eye. Thus, substantial bit savings may be derived without significantly degrading the quality of the reconstructed image.

In a video region where neighboring blocks are identical or near-identical, use of intra prediction may result in a residual block comprising many zero and/or near-zero pixel values. Furthermore, transformation, quantization, and/or scanning of the residual block may remove many of the zero and/or near-zero coefficients from the encoded data stream, thereby resulting in further compression of video data. Thus, more accurate prediction of the original image may result in higher coding efficiencies. To improve accuracy of intra prediction, video/image coding standards may utilize a plurality of intra prediction modes. For example, up to six intra prediction modes may be used for the chroma components (including Cr and Cb) in high efficiency video coding (HEVC), which is poised to be the next video standard issued by the Joint Collaborative Team on Video Coding (JCT-VC) of the International Telecommunications Union (ITU) Telecommunications Standardization Sector (ITU-T) and International Organization for Standardization (ISO)/International Electrotechnical Commission (IEC).

For the chroma components, six intra prediction modes may include a chroma from luma prediction mode (referred to as a linear model or method (LM) mode), a vertical prediction mode, a horizontal prediction mode, a diagonal mode, a direct current (DC) prediction mode, and a direct mode (DM) derived from the luma component. Various algorithms may be used to determine an optimal intra prediction mode for a chroma block. For example, an encoder may test intra predict a chroma block using some or all of the available modes, and then calculate a sum of absolute error (SAE) for each prediction mode. The prediction mode leading to the smallest SAE may be selected as the optimal mode. It should be noted that in a final HEVC standard to be issued, the intra prediction modes used for the chroma components may be different from the six aforementioned modes. The present disclosure mainly relates to the LM mode.

According to a HEVC work draft entitled "WD5: Working Draft 5 of High-Efficiency Video Coding" with document number: JCTVC-G1103_d6, which is hereby incorporated by reference, a current design of LM mode utilizes reconstructed luma samples or pixels to generate chroma samples. Specifically, when a LM mode is to be implemented to generate a prediction block for a current chroma (Cb or Cr) block, the LM mode comprises obtaining a linear combination of previously reconstructed luma samples that have been interpolated from within a corresponding luma block of the current chroma block. The LM mode further comprises obtaining a linear combination of previously reconstructed luma samples from luma blocks which neighbor the corresponding luma block. In addition, the LM mode further comprises obtaining previously reconstructed chroma samples from chroma blocks which neighbor the current chroma block.

According to JCTVC-G1103_d6, sample values of the chroma prediction block may be derived using algorithms and/or equations (1) to (19) described in paragraphs below. Before getting to the equations, definitions of variables used in equations herein are given first.

For a reconstructed luma block with 2 nS (nS is a positive integer) luma samples on each of its four sides, [x, y] denotes a position or index of a luma sample in the reconstructed luma block, wherein both integers x and y range from 0 to 2 nS−1. Further, recSamples$_L$[x, y] denotes a luma sample at position [x, y]. In HEVC working drafts (e.g., Document JCTVC-G1103_d6), recSamples$_L$[x, y] may sometimes also be denoted as $P_{LM}$[x, y]. In equations herein, notation: m=n . . . k is used to suggest a range of values, wherein m starts from n (including n) and ends with k (including k), and wherein m, n, and k are all integers. For instance, x and y ranging from 0 to 2 nS−1 is denoted as "x, y=0 . . . 2 nS−1".

As mentioned above, reconstructed luma samples in the left and top neighboring luma blocks may also be used in the LM mode to predict the current chroma block. [x, −1] denotes a position or index of a luma sample in a column left to and adjacent the corresponding luma block (referred to hereafter as the left neighboring column), and [−1, y] denotes a position of a luma sample in the row above and adjacent the corresponding luma block (referred to hereafter as the top neighboring row), wherein both x and y range from 0 to 2 nS−1. Further, recSamples$_L$[x, −1] denotes a luma sample at position [x, −1], and recSamples$_L$[−1, y] denotes a luma sample at position [−1, y].

In 4:2:0 sampling, the reconstructed 2 nS×2 nS corresponding luma block may be first filtered to an nS×nS luma block, which is then used as a reference block for intra prediction of the current chroma block. For the filtered luma block with nS luma samples on each of its four sides, $p_Y$'[x, y] denotes a filtered luma sample at position [x, y] wherein both x and y range from 0 to nS−1. Similarly, the left neighboring column and the top neighboring row comprising luma samples may also be first filtered before used reference samples in the LM mode. After filtering, $p_Y$'[x, −1] denotes a filtered luma sample at position [x, −1], and $p_Y'[−1, y]$ denotes a value of a filtered luma sample at position [−1, y], wherein both x and y range from 0 to nS−1.

As mentioned above, previously coded chroma samples in the left and top neighboring chroma blocks may also be used in the LM mode. In the neighboring chroma blocks, [x, −1] denotes an index of a chroma sample in a column left to and adjacent the current chroma block (also referred to as the left neighboring column), and [−1, y] denotes an index of a chroma sample in the row above and adjacent the current chroma block (also referred to as the top neighboring row), wherein both x and y range from 0 to nS−1. Further, p[x, −1] denotes a chroma sample at position [x, −1], and p[−1, y] denotes a chroma sample at position [−1, y], wherein both x and y range from 0 to nS−1.

For the chroma prediction block to be computed, predSamples[x, y] denotes a prediction or predicted chroma sample at position [x, y], wherein x and y range from 0 to nS−1. BitDepthC denotes a number of bits (i.e., bit depth) used for the chroma component (Cr or Cb). For example, in HEVC, BitDepthC may equal 8 or 10 (or any other suitable value). If BitDepthC=8, chroma samples such as p[x, y] and predSamples[x, y] may have a maximum of 8 bits. In use, the luma component may typically have a same bit depth as the chroma component, thus filtered luma samples such as $p_Y'[x, y]$ have a same maximum number of bits as p[x, y].

In the LM mode, to generate predicted chroma samples, the reconstructed luma samples are filtered first. Equation (1) applies a 3-tap filter with [1 2 1] coefficients to 2 nS reconstructed luma samples located in the left neighboring column and produces nS filtered luma samples. Equation (2) applies a 2-tap averaging filter to 2 nS reconstructed luma samples in the top neighboring row and produces nS filtered luma samples. Equation (3) applies a 2-tap averaging filter to 2 nS×2 nS reconstructed luma samples in the corresponding luma block and produces nS×nS filtered luma samples.

$$p_Y'[x,-1] = (recSamples_L[2x-1,-1] + 2*recSamples_L[2x,-1] + recSamples_L[2x+1,-1]+2) >> 2, \text{ with } x=0 \ldots nS-1 \quad (1)$$

$$p_Y'[-1,y] = (recSamples_L[-1,2y] + recSamples_L[-1,2y+1]) >> 1, \text{ with } y=0 \ldots nS-1 \quad (2)$$

$$p_Y'[x,y] = (recSamples_L[2x,2y] + recSamples_L[2x,2y+1]) >> 1, \text{ with } x,y=0 \ldots nS-1 \quad (3)$$

Next, predicted chroma samples (i.e., predSamples[x, y], with x, y=0 . . . nS−1) can be computed via intermediate variables, denoted alpha (α) and beta (β), using equations:

$$\text{alpha} = \frac{\left[2*nS*\left(\sum_{y=0}^{nS-1} p_Y'[-1,y]*p[-1,y] + \sum_{y=0}^{nS-1} p_Y'[x,-1]*p[x,-1]\right) - \left(\sum_{y=0}^{nS-1} p_Y'[-1,y] + \sum_{x=0}^{nS-1} p_Y'[x,-1]\right)\left(\sum_{y=0}^{nS-1} p[-1,y] + \sum_{x=0}^{nS-1} p[x,-1]\right)\right]}{\left[2*nS*\left(\sum_{y=0}^{nS-1} p_Y'[-1,y]^2 + \sum_{x=0}^{nS-1} p_Y'[x,-1]^2\right) - \left(\sum_{y=0}^{nS-1} p_Y'[-1,y] + \sum_{x=0}^{nS-1} p_Y'[x,-1]\right)^2\right]} \quad (4)$$

$$\text{beta} = \frac{\left(\sum_{y=0}^{nS-1} p[-1,y] + \sum_{x=0}^{nS-1} p[x,-1]\right) - \text{alpha}*\left(\sum_{y=0}^{nS-1} p_Y'[-1,y] + \sum_{x=0}^{nS-1} p_Y'[x,-1]\right)}{2*nS} \quad (5)$$

$$predSamples[x, y] = \text{alpha} * p_Y'[x, y] + \text{beta}, \text{ with } x, y = 0 \ldots nS - 1 \quad (6)$$

From equations (4) to (6), note that the final value of a prediction chroma sample depends on both the luma and chroma components which have already been coded. In the luma component, filtered luma samples in the left neighboring column, top neighboring row, and corresponding luma block are taken into account. In the chroma component, reconstructed chroma samples in the left neighboring column and top neighboring row are taken into account.

The computation of alpha in equation (4) and beta in equation (5) may be overly complex to implement, thus in practice after obtaining filtered luma samples (i.e., $p_Y'[x, y]$) using equations (1) to (3), more intermediate variables are introduced to derive predicted chroma samples (i.e., predSamples [x, y]). Further, instead of divisional operations, integer and/or bit-wise operations are used. Definition of operators used herein, such as &&, <<, >>, ^, and others, are included in the HEVC work draft. For example, intermediate variables, denoted as k3, L, C, LL, LC, and k2, are derived as follows:

$$k3 = \text{Max}(0, BitDepth_C + \log_2(nS) - 14) \quad (7)$$

$$L = \left(\sum_{y=0}^{nS-1} p_Y'[-1, y] + \sum_{x=0}^{nS-1} p_Y'[x, -1]\right) >> k3 \quad (8)$$

$$C = \left(\sum_{y=0}^{nS-1} p[-1, y] + \sum_{x=0}^{nS-1} p[x, -1]\right) >> k3 \quad (9)$$

$$LL = \left(\sum_{y=0}^{nS-1} p_Y'[-1, y]^2 + \sum_{x=0}^{nS-1} p_Y'[x, -1]^2\right) >> k3 \quad (10)$$

$$LC = \left(\begin{array}{l}\sum_{y=0}^{nS-1} p_Y'[-1, y] * p[-1, y] + \\ \sum_{y=0}^{nS-1} p_Y'[x, -1] * p[x, -1]\end{array}\right) >> k3 \quad (11)$$

$$k2 = \log_2((2*nS) >> k3) \quad (12)$$

Next, more intermediate variables, denoted as a1, a2, k1, a1s, a2s, a3, a, k, and b, are derived using the following pseudo code:

$$a1 = (LC << k2) - L*C \quad (13)$$

$$a2 = (LL << k2) - L*L \quad (14)$$

$$k1=\text{Max}(0,\log_2(\text{abs}(a2))-5)-\text{Max}(0,\log_2(\text{abs}(a1))-14)+2 \quad (15)$$

$$a1s=a1\text{>>}\text{Max}(0,\log_2(\text{abs}(a1))-14) \quad (16)$$

$$a2s=\text{abs}(a2\text{>>}\text{Max}(0,\log_2(\text{abs}(a2))-5)) \quad (17)$$

$$a3=a2s<1?0:\text{Clip3}(-2^{15},2^{15}-1,a1s*1m\text{Div}[a2s]+(1\text{<<}(k1-1)))\text{>>}k1 \quad (18)$$

$$a=a3\text{>>}\text{Max}(0,\log_2(\text{abs}(a3))-6) \quad (19)$$

$$k=13-\text{Max}(0,\log_2(\text{abs}(a))-6) \quad (20)$$

$$b=(C-((a*L)\text{>>}k)+(1\text{<<}(k2-1)))\text{>>}k2 \quad (21)$$

Variable a in equation (19) may be a representation of alpha, and variable b in equation (21) may be a representation of beta. After obtaining a, b, and k, predicted chroma samples are computed using equation:

$$\text{predSamples}[x,y]=\text{Clip1}_C(((p_Y'[x,y]*a)\text{>>}k)+b), \text{ with } x,y=0\ldots nS-1 \quad (22)$$

where function $\text{Clip1}_C(x)$ is defined as:

$$\text{Clip1}_C(x)=\text{Clip3}(0,(1\text{<<}\text{BitDepth}_C)-1,x)$$

and where function $\text{Clip3}(x, y, z)$ is defined as:

$$\text{Clip3}(x, y, z) = \begin{cases} x; & z < x \\ y; & z < y \\ z; & \text{otherwise} \end{cases}$$

In the above pseudo code, after a2s is calculated from equation (17), it is used as an index or key of a look-up table to get a value of 1 mDiv, which is then used in equation (18). Table 1 shows a specification of an 1 mDiv look-up table, which is listed as Table 8-9 in the work draft JCTVC-G1103_d6.

TABLE 1

Specification of lmDiv look-up table in JCTVC-G1103_d6.

| a2s | 1 | 2 | 3 | 4 | 5 | 6 | 7 | 8 | 9 | 10 | 11 | 12 | 13 |
|---|---|---|---|---|---|---|---|---|---|---|---|---|---|
| lmDiv | 32768 | 16384 | 10923 | 8192 | 6554 | 5461 | 4681 | 4096 | 3641 | 3277 | 2979 | 2731 | 2521 |
| a2s | 14 | 15 | 16 | 17 | 18 | 19 | 20 | 21 | 22 | 23 | 24 | 25 | 26 |
| lmDiv | 2341 | 2185 | 2048 | 1928 | 1820 | 1725 | 1638 | 1560 | 1489 | 1425 | 1365 | 1311 | 1260 |
| a2s | 27 | 28 | 29 | 30 | 31 | 32 | 33 | 34 | 35 | 36 | 37 | 38 | 39 |
| lmDiv | 1214 | 1170 | 1130 | 1092 | 1057 | 1024 | 993 | 964 | 936 | 910 | 886 | 862 | 840 |
| a2s | 40 | 41 | 42 | 43 | 44 | 45 | 46 | 47 | 48 | 49 | 50 | 51 | 52 |
| lmDiv | 819 | 799 | 780 | 762 | 745 | 728 | 712 | 697 | 683 | 669 | 655 | 643 | 630 |
| a2s | 53 | 54 | 55 | 56 | 57 | 58 | 59 | 60 | 61 | 62 | 63 | 64 | |
| lmDiv | 618 | 607 | 596 | 585 | 575 | 565 | 555 | 546 | 537 | 529 | 520 | 512 | |

Since 1 mDiv is a function of variable a2s, each entry of 1 mDiv in Table 1 can be calculated using following pseudo code, wherein i=a2s:
UInt 1 mDiv [32];
for (Int i=1; i<64; i++)

$$1m\text{Div}[i]=((1\text{<<}15)+i/2)/i \quad (23)$$

Although the predicted chroma samples may be generated using the above algorithm, due to the presence of multipliers with large bit widths during the derivation process, the complexity of the algorithm may be quite high. According to configurations of HEVC test models (HMs), a current chroma block may have size nS in the range: 4≤nS≤32, and an input bit depth of the luma and chroma components may be 8 or 10. Suppose, for example, the input bit depth is 8 (bit depth of 10 can be similarly analyzed), then a bit width of the neighboring filtered luma samples ($p_Y'[-1, y]$ and $p_Y'[x, -1]$) and a bit width of the neighboring reconstructed chroma samples ($p[-1, y]$ and $p[x, -1]$) may both be 8. Since a maximum of nS is 32 (i.e., $2^5$) in HMs, the intermediate variable L calculated in equation (8) may have a maximum of 13 (i.e., 8+5) bits. Similarly, the intermediate variable C calculated in equation (9) may also have a maximum of 13 bits.

In equation (10), calculation of LL uses 2*nS unsigned multipliers (i.e., $p_Y'[-1, y]$ and $p_Y'[x, -1]$) with a maximum of 8 bits. Thus, LL may have a maximum of 21 bits. Similarly, in equation (11), LC may also have a maximum of 21 bits. Then, in equation (13), calculation of a1 involves bit shifting of LC as well as multiplication of L and C. Since multipliers L and C may have a maximum of 13 bits, their product L*C may have a maximum of 26 bits. Thus, equation (13) may have 13-bit multipliers (i.e., L and C) as well as a 26-bit subtractor (i.e., L*C). Similarly, the calculation of a2 in equation (14) may involve a 13-bit multiplier (i.e., L) as well as a 26-bit subtractor (i.e., L*L). In use, the computation of equations (13) and (14) may be among the most complex steps in HEVC coding tools, due to mathematical operations on variables (e.g., multipliers) with large numbers of bits. The presence of the large multipliers may lower coding efficiency, speed and/or performance.

Disclosed herein are systems and methods for improving intra prediction of the LM mode by introducing a number of new parameters during computation, which may reduce bit widths of multipliers involved in computation. A disclosed LM mode may be implemented in a video codec. In the disclosed LM mode, a rounding or flooring function of an average of reconstructed chroma samples located in neighboring blocks of a current chroma block may be computed. In addition, in 4:4:4 sampling, a rounding or flooring function of an average of reconstructed luma samples located in neighboring blocks of a corresponding reconstructed luma block may also be computed. Alternatively, in 4:2:0 sampling, the reconstructed luma block may first be downsampled via filtering. Then, a rounding or flooring function of an average of filtered luma samples located in neighboring blocks may be computed. Further, rounding/flooring errors caused by integer conversion of the average values may also be computed. A difference between each neighboring luma sample and the average luma value, and a difference between each neighboring chroma sample and the average chroma value may also be computed. By using some or all of these parameters, some of the multipliers computed in the LM mode may have a reduced bit width. Moreover, a total number of required mathematical operations may be reduced. By using disclosed algorithm, the LM mode may improve coding performance in, e.g., HEVC.

FIG. 1 illustrates an embodiment of a video encoder 100, in which a disclosed LM mode may be used. The video encoder 100 may comprise a rate-distortion optimization (RDO) module 110, a prediction module 120, a transform module 130, a quantization module 140, an entropy encoder 150, a de-quantization module 160, an inverse transform module 170, and a reconstruction module 180 arranged as shown in FIG. 1. In operation, the video encoder 100 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to coordinate or make logic decisions for one or more of other modules. For example, based on one or more previously encoded frames, the RDO module 110 may determine how a current frame (or slice) being encoded is partitioned into a plurality of coding units (CUs), and how a CU is partitioned into one or more prediction units (PUs) and transform units (TUs). CU, PU, and TU are various types of blocks used in HEVC. In addition, the RDO module 110 may determine how the current frame is to be predicted. The current frame may be predicted via inter and/or intra prediction. For intra prediction, there are a plurality of available prediction modes or directions in HEVC (e.g., 34 modes for the Y component and six modes (including LM mode) for the U or V component), and an optimal mode may be determined by the RDO module 110. For example, the RDO module 110 may calculate a sum of absolute error (SAE) for each prediction mode, and select a prediction mode that results in the smallest SAE.

The prediction module 120 may utilize either reference frames for inter prediction or reference pixels in the current frame for intra prediction. In an embodiment, the prediction module 120 is configured to use a disclosed LM mode to generate a prediction block for a current chroma block from the input video. The prediction block comprises a plurality of predicted chroma samples, each of which may be generated based on a first plurality of reconstructed luma samples located in a corresponding reconstructed luma block, a second plurality of reconstructed luma samples located in neighboring blocks of the corresponding reconstructed luma block, and a plurality of reconstructed chroma samples located in neighboring blocks of the chroma block. In an embodiment, generating each predicted chroma sample comprises computing the intermediate variable a2s using e.g., equation (17) described earlier, which is based on the second plurality of reconstructed luma samples. Generating each predicted chroma sample further comprises deriving the intermediate variable 1 mDiv from a2s using a look-up table. In an embodiment, the look-up table may comprise less than 64 a2s values.

Upon generation of the prediction block for the current chroma block, the current chroma block may be subtracted by the prediction block, or vice versa, to generate a residual block. The residual block may be fed into the transform module 130, which may convert residual chroma samples into a matrix of transform coefficients. Then, the matrix of transform coefficients may be quantized by the quantization module 140 before being fed into the entropy encoder 150. The quantization module 140 may alter the scale of the transform coefficients and round them to integers, which may reduce the number of non-zero transform coefficients. As a result, a compression ratio may be increased. Quantized transform coefficients may be scanned and encoded by the entropy encoder 150 into an encoded bitstream. Further, to facilitate continuous encoding of chroma blocks, the quantized transform coefficients may also be fed into the de-quantization module 160 to recover the original scale of the transform coefficients. Then, the inverse transform module 170 may perform the inverse of the transform module 130 and generate a noisy version of the original residual block. Then, the lossy residual block may be fed into the reconstruction module 180, which may generate reconstructed luma and/or chroma samples for intra prediction of future chroma blocks. If desired, filtering may be performed on the reconstructed samples before they are used for intra prediction.

It should be noted that FIG. 1 may be a simplified illustration of a video encoder, thus it may include only part of modules present in the video encoder. Other modules (e.g., filter, scanner, and transmitter), although not shown in FIG. 1, may also be included to facilitate video encoding as understood by one of skill in the art. In addition, depending on the encoding scheme, some of the modules in the video encoder may be skipped. For example, in lossless encoding of certain video content, no information loss may be allowed, thus the quantization module 140 and the de-quantization module 160 may be skipped. For another example, if the residual block is encoded directly without being converted to transform coefficients, the transform module 130 and the inverse transform module 170 may be skipped. Moreover, prior to transmission from the encoder, the encoded bitstream may be configured to include other information, such as video resolution, frame rate, block partitioning information (sizes, coordinates), prediction modes, etc., so that the encoded sequence of video frames may be properly decoded by a video decoder.

Figure 2:
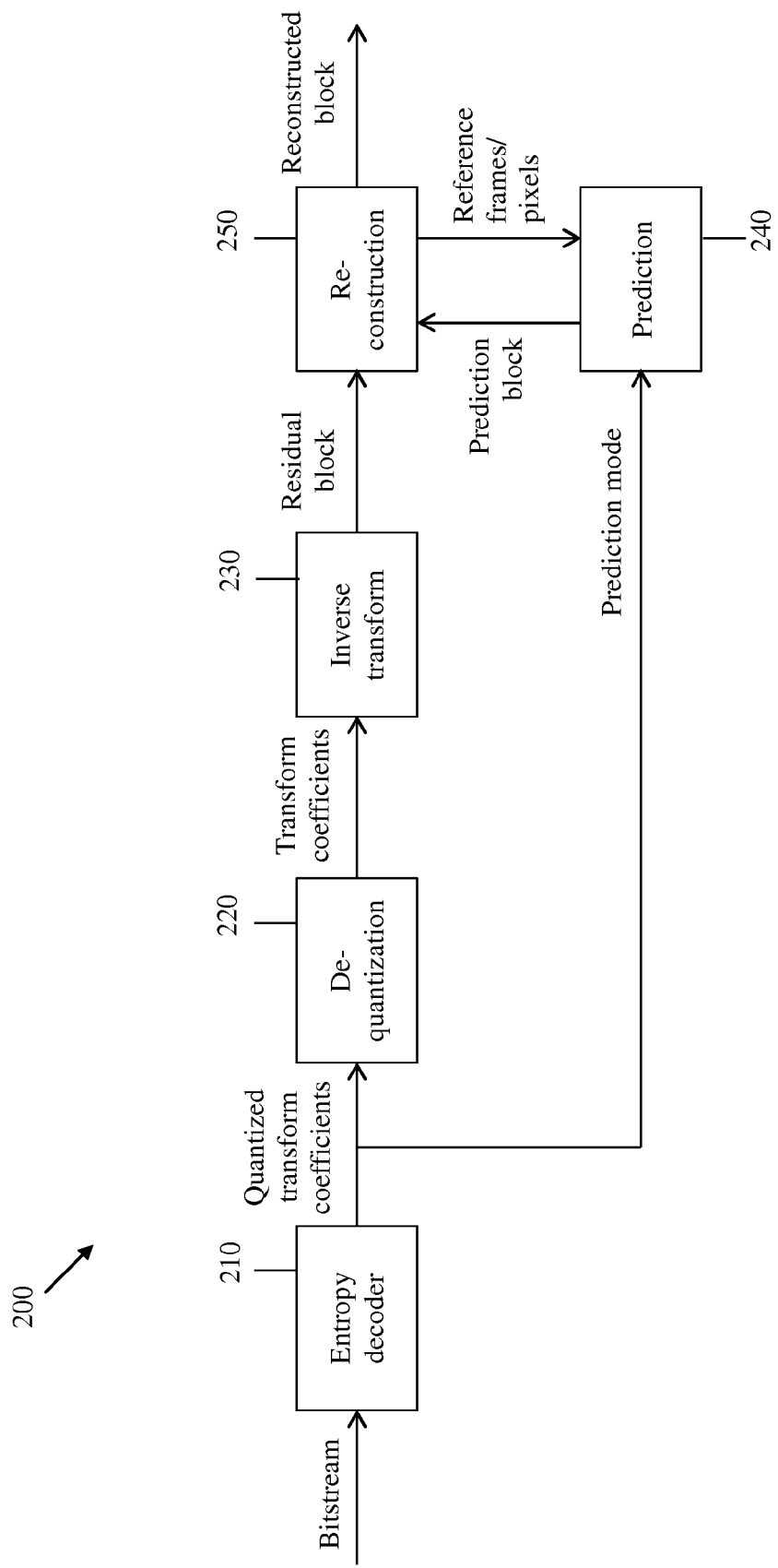
FIG. 2 is a schematic diagram of an embodiment of a video decoding system.

FIG. 2 illustrates an embodiment of a video decoder 200, in which a disclosed LM mode may be used. The video decoder 200 may correspond to the video encoder 100, and may comprise an entropy decoder 210, a de-quantization module 220, an inverse transform module 230, a prediction module 240, and a reconstruction module 250 arranged as shown in FIG. 2. In operation, an encoded bitstream containing information of a sequence of video frames may be received by the entropy decoder 210, which may decode the bitstream to an uncompressed format. A matrix of quantized transform coefficients may be generated, which may then be fed into the de-quantization module 220, which may be the same or similar to the de-quantization module 160 in FIG. 1. Then, output of the de-quantization module 220 may be fed into the inverse transform module 230, which may convert transform coefficients to residual values of a residual block. In addition, information containing a prediction mode (e.g., the LM mode) of the current block may also be decoded by the entropy decoder 210. Based on the prediction mode, the prediction module 240 may generate a prediction block for the current block.

In an embodiment, the prediction module 240 is configured to use a disclosed LM mode to generate a prediction block for a current chroma block. The prediction block comprises a plurality of predicted chroma samples, each of which may be generated based on a first plurality of reconstructed luma samples located in a corresponding reconstructed luma block (already decoded), a second plurality of reconstructed luma samples located in neighboring blocks (already decoded) of the corresponding reconstructed luma block, and a plurality of reconstructed chroma samples located in neighboring blocks (already decoded) of the chroma block. In an embodiment, generating each predicted chroma sample comprises computing the intermediate variable a2s, which is based on the second plurality of reconstructed luma samples. Generating each predicted chroma sample further comprises deriving the intermediate variable 1 mDiv from a2s using a look-up table. In an embodiment, the look-up table may comprise less than 64 a2s values. Upon generation of the prediction block for the current chroma block, the reconstruction module 250 may combine the residual chroma block with the prediction block to generate a reconstructed chroma block. Additionally, to facilitate continuous decoding, some chroma samples of the reconstructed chroma block may also serve as reference pixels for intra prediction of future chroma blocks in the same frame.

In a video codec (e.g., the video encoder 100 or decoder 200), other parameters or intermediate variables are introduced herein to simplify the LM mode used in intra prediction. In an embodiment, generating a prediction block for a current chroma block involves computing a function of an average of filtered luma samples located in neighboring blocks of a corresponding reconstructed luma block. The function of the average of the filtered luma samples is denoted as avgY'. Generating the prediction block may further involve computing a function of an average of reconstructed chroma samples located in neighboring blocks of the current chroma block. The function of the average of the reconstructed chroma samples is denoted as avgC.

The functions of the average values may be any suitable function including, but not limited to, a flooring function, a rounding function, or a ceiling function. These functions may be referred to collectively as integer functions, since each of them obtain an integer value that is closest or nearest to the average values. In other words, using any integer function disclosed herein, there may be no other integer value between an average value and the result of the integer function. If the integer function is a rounding function, an absolute difference between the average value and the result of the integer function may be no greater than 0.5. Otherwise if the integer function is a flooring function, the average value may be no less than the result of the integer function but a difference between the two less than one. For example, in an embodiment, the two functions are both rounding functions. In this case, avgY' and avgC are computed according to the following equations:

$$avgY' = \text{round}\left(\frac{\sum_{y=0}^{nS-1} p'_Y[-1, y] + \sum_{x=0}^{nS-1} p'_Y[x, -1]}{2*nS}\right) \quad (24)$$
$$= \left(\sum_{y=0}^{nS-1} p'_Y[-1, y] + \sum_{x=0}^{nS-1} p'_Y[x, -1] + (1 << (\log_2(2*nS) - 1))\right) >> (\log_2(2*nS))$$

$$avgC = \text{round}\left(\frac{\sum_{y=0}^{nS-1} p[-1, y] + \sum_{x=0}^{nS-1} p[x, -1]}{2*nS}\right) \quad (25)$$
$$= \left(\sum_{y=0}^{nS-1} p[-1, y] + \sum_{x=0}^{nS-1} p[x, -1] + (1 << (\log_2(2*nS) - 1))\right) >> (\log_2(2*nS))$$

In another embodiment, the two functions are both flooring functions. In this case, avgY' and avgC are computed according to the following equations:

$$avgY' = \text{floor}\left(\frac{\sum_{y=0}^{nS-1} p'_Y[-1, y] + \sum_{x=0}^{nS-1} p'_Y[x, -1]}{2*nS}\right) \quad (26)$$
$$= \left(\sum_{y=0}^{nS-1} p'_Y[-1, y] + \sum_{x=0}^{nS-1} p'_Y[x, -1]\right) >> (\log_2(2*nS))$$

$$avgC = \text{floor}\left(\frac{\sum_{y=0}^{nS-1} p[-1, y] + \sum_{x=0}^{nS-1} p[x, -1]}{2*nS}\right) \quad (27)$$
$$= \left(\sum_{y=0}^{nS-1} p[-1, y] + \sum_{x=0}^{nS-1} p[x, -1]\right) >> (\log_2(2*nS))$$

In an embodiment, avgY' may have a maximum bit width equal to or identical with an input bit depth of the luma component. For example, if the input bit depth is 8, avgY' may have a maximum of 8 bits. If the input bit depth is 10, avgY' may have a maximum of 10 bits. Similar to avgY', the floored average value avgC may also have a maximum bit width equal to an input bit depth of the chroma component (U or V).

The parameters avgY' and avgC may be used in various approaches including a first approach and a second approach, which will be described sequentially below. In an embodiment of the first approach, two additional parameters or intermediate variables, denoted as RErrY' and RErrC may be computed in a disclosed LM mode. RErrY' may indicate a difference between a sum of the filtered neighboring luma samples and 2*nS*avgY', and RErrC may indicate a difference between a sum of the reconstructed neighboring chroma samples and 2*nS*avgC. The differences may also be referred as rounding or flooring errors, since they may be caused by rounding or flooring of the average values. RErrY' and RErrC may be computed using the following equations:

$$RErrY' = \sum_{y=0}^{nS-1} p'_Y[-1, y] + \sum_{x=0}^{nS-1} p'_Y[x, -1] - 2*nS*avgY' \quad (28)$$

$$RErrC = \sum_{y=0}^{nS-1} p[-1, y] + \sum_{x=0}^{nS-1} p[x, -1] - 2*nS*avgC \quad (29)$$

In implementation, RErrY' and RErrC in equations (28) and (29) may be computed in various equivalent forms. For example, RErrY' and RErrC may be computed following equations (30) and (31), which have an expression different from equations (28) and (29) but in essence are equivalent to equations (28) and (29). One skilled in the art would recognize that other equivalent expressions may also be used within the scope of this disclosure. In any equivalent form, RErrY' may represent a difference (or a shifted difference) between $2*nS*avgY'$ and a sum of a plurality of filtered luma samples located in neighboring blocks of the corresponding luma block and adjacent to the corresponding luma block. Similarly, RErrC may represent a difference (or a shifted difference) between $2*nS*avgC$ and a sum of a plurality of reconstructed chroma samples located in neighboring blocks of the chroma block and adjacent to the chroma block.

$$RErrY' = \left(\sum_{y=0}^{nS-1} p'_Y[-1, y] + \sum_{x=0}^{nS-1} p'_Y[x, -1]\right) - \quad (30)$$
$$(avgY' << \log_2(2*nS))$$
$$= \left(\sum_{y=0}^{nS-1} p'_Y[-1, y] + \sum_{x=0}^{nS-1} p'_Y[x, -1]\right) \&$$
$$((1 << \log_2(2*nS)) - 1)$$

$$RErrC = \left(\sum_{y=0}^{nS-1} p[-1, y] + \sum_{x=0}^{nS-1} p[x, -1]\right) - \quad (31)$$
$$(avgC << \log_2(2*nS))$$
$$= \left(\sum_{y=0}^{nS-1} p[-1, y] + \sum_{x=0}^{nS-1} p[x, -1]\right) \&$$
$$((1 << \log_2(2*nS)) - 1)$$

From equation (28) or its equivalent forms, it can be seen that if avgY' uses a rounding function, the rounding error RErrY' may be a signed integer. Alternatively, if avgY' uses a flooring function, RErrY' may be a non-negative (unsigned) integer. A mathematical proof is given as follows:

$$\therefore avgY' = \text{floor}\left(\frac{\sum_{y=0}^{nS-1} p'_Y[-1, y] + \sum_{x=0}^{nS-1} p'_Y[x, -1]}{2*nS}\right) \leq$$

$$\frac{\sum_{y=0}^{nS-1} p'_Y[-1, y] + \sum_{x=0}^{nS-1} p'_Y[x, -1]}{2*nS}$$

$$\therefore (avgY' << \log_2(2*nS)) \leq \left(\sum_{y=0}^{nS-1} p'_Y[-1, y] + \sum_{x=0}^{nS-1} p'_Y[x, -1]\right)$$

$$\therefore RErrY' = \sum_{y=0}^{nS-1} p'_Y[-1, y] + \sum_{x=0}^{nS-1} p'_Y[x, -1]) - (avgY' << \log_2(2*nS) \geq 0.$$

Further, it can be seen that RErrY' may have a maximum bit width equal to or less than an input bit depth of the luma component. For example, if the input bit depth is 8, RErrY' may have a maximum of 8 bits if avgY' is a floored average. (not including sign bit in case RErrY' is a signed integer). If the input bit depth is 10, RErrY' may have a maximum of 10 bits. Similar to RErrY', RErrC may also be a signed integer (if avgC uses a rounding function) or an unsigned integer (if avgC uses a flooring function). In addition, RErrC may have a maximum bit width equal to an input bit depth of the chroma component (U or V) if avgC is a floored average.

With the introduction of intermediate variables RErrY' and RErrC, the algorithm complexity of a disclosed LM mode may be lowered. Compared to the original algorithm as shown in equations (1) to (19), calculations of some intermediate variables are simplified, which will be shown mathematically below. For example, the intermediate variable a1 may now be calculated as follows:

$$a1 = (LC << k2) - L*C \quad (32)$$

$$= \frac{\left(\sum_{y=0}^{nS-1} p'_Y[-1, y]*p[-1, y] + \sum_{y=0}^{nS-1} p'_Y[x, -1]*p[x, -1]\right)*2^{k2}}{2^{k3}} -$$

$$\frac{\left(\sum_{y=0}^{nS-1} p'_Y[-1, y] + \sum_{x=0}^{nS-1} p'_Y[x, -1]\right)}{2^{k3}} *$$

$$\frac{\left(\sum_{y=0}^{nS-1} p[-1, y] + \sum_{x=0}^{nS-1} p[x, -1]\right)}{2^{k3}}$$

$$= \frac{2*nS*\left(\sum_{y=0}^{nS-1} p'_Y[-1, y]*p[-1, y] + \sum_{y=0}^{nS-1} p'_Y[x, -1]*p[x, -1]\right)}{2^{2*k3}} -$$

$$\frac{(2*nS*avgY' + RErrY')*(2*nS*avgC + RErrC)}{2^{2*k3}}$$

$$= \frac{2*nS*\left(\sum_{y=0}^{nS-1} p'_Y[-1, y]*p[-1, y] + \sum_{y=0}^{nS-1} p'_Y[x, -1]*p[x, -1]\right)}{2^{2*k3}} -$$

$$\frac{2*nS*(2*nS*avgY'*avgC + avgY'*RErrC + RErrY'*avgC) +}{RErrY'*RErrC}$$
$$\frac{}{2^{2*k3}}$$

Ignoring the term RErrY'*RErrC, which may be a relatively small value, a1 is replaced by a1':

$$a1' = \frac{2*nS*\left(\sum_{y=0}^{nS-1} p'_Y[-1,y]*p[-1,y] + \sum_{y=0}^{nS-1} p'_Y[x,-1]*p[x,-1]\right)}{2^{2*k3}} - \frac{2*nS*(2*nS*avgY'*avgC + avgY'*RErrC + RErrY'*avgC)}{2^{2*k3}}$$

(33)

In equation (33), it can be seen that multipliers including avgY', avgC, RErrY', and RErrC may have a maximum bit width equal to an input bit depth of the luma and chroma components. For example, if the input bit depth (e.g., BitDepth$_C$) is 8, only multipliers with a maximum of 8 bits are needed for the calculation of a1'. If input bit depth is 10, only multipliers with a maximum of 10 bits are needed for the calculation of a1'. Compared with the original algorithm which computes larger multipliers L and C (maximum of 13 bits if input bit depth is 8) to calculate a1, the complexity of computing a1' may be relatively lower.

Similarly, the intermediate variable a2 may now be calculated as follows:

$$a2 = (LL << k2) - L*L \qquad (34)$$

$$= \frac{\left(\sum_{y=0}^{nS-1} p'_Y[-1,y]^2 + \sum_{x=0}^{nS-1} p'_Y[x,-1]^2\right)*2^{k2}}{2^{k3}} - \frac{\left(\sum_{y=0}^{nS-1} p'_Y[-1,y] + \sum_{x=0}^{nS-1} p'_Y[x,-1]\right)^2}{2^{2*k3}}$$

$$= \frac{\left(\sum_{y=0}^{nS-1} p'_Y[-1,y]^2 + \sum_{x=0}^{nS-1} p'_Y[x,-1]^2\right)*2^{k2+k3} - (2*nS*avgY' + RErrY')^2}{2^{2*k3}}$$

$$= \frac{2*nS*\left(\sum_{y=0}^{nS-1} p'_Y[-1,y]^2 + \sum_{x=0}^{nS-1} p'_Y[x,-1]^2\right) - 4*nS^2*avgY'^2 - 4*nS*avgY'*RErrY' - RErrY'^2}{2^{2*k3}}$$

Ignoring the term RErrY'*RErrC, which may be a relatively small value, a2 is replaced by a2':

$$a2' = \frac{2*nS*(LL - (2*nS*avgY'^2 + 2*avgY'*RErrY'))}{2^{2*k3}} \qquad (35)$$

In equation (35), it can be seen that multipliers avgY' and RErrY' have a maximum bit width equal to an input bit depth of the luma and chroma components. For example, if the input bit depth (e.g., BitDepth$_C$) is 8, only multipliers with a maximum of 8 bits are needed for the calculation of a2'. If input bit depth is 10, only multipliers with a maximum of 10 bits are needed for the calculation of a2'. Compared with the original algorithm which uses larger multiplier L to calculate a2, the complexity of computing a2' may be relatively lower.

Alpha in equation (4) may be replaced by alpha', which may be calculated from a1' and a2' using equation:

$$alpha' = \frac{LC - \frac{a1'}{a2'}}{LL - (2*nS*avgY'*avgC + avgY'*RErrC + RErrY'*avgC)} \qquad (36)$$

Equation (36) indicates that multipliers avgY', avgC, RerrY', and RerrC may all have a maximum bit width equal to an input bit depth of the luma and chroma components. If the input bit depth is 8, no multiplier more than 8-bits may be needed to calculate alpha'.

Similar to alpha, using the parameters of avgY', RErrY', avgC, and RErrC, the original calculation of beta in equation (5) can be rewritten as:

$$beta = \frac{2*nS*avgC + RErrC - alpha*(2*nS*avgY'*RErrY')}{2*nS} \qquad (37)$$

In equation (37), since the rounding errors RErrC and RErrY' may typically be much smaller than 2*nS*avgC and 2*nS*avgC, respectively, the two rounding/flooring errors may be ignored from the numerator. Thus, in equation (37), alpha is replaced by alpha' and beta is replaced by beta', which is computed as:

$$beta' = \frac{2*nS*avgC - alpha'*2*nS*avgY'}{2*nS} = avgC - alpha'*avgY' \qquad (38)$$

In equation (38), multipliers alpha' and RErrY' may both have a maximum bit width equal to an input bit depth of the luma and chroma components. For example, if the input bit depth (e.g., BitDepth$_C$) is 8, only multipliers with a maximum of 8 bits are needed for the calculation of beta'. If input bit depth is 10, only multipliers with a maximum of 10 bits are needed for the calculation of beta'. Compared with the original algorithm which uses larger multiplier L to calculate beta in equation (21), the computation complexity in the calculation of beta' may be made relatively lower. Further, no bit shifting is needed anymore to calculate beta'.

From the above description, it can be seen that by introducing parameters avgY', RErrY', avgC, and RErrC, calculation of both alpha' and beta' involve multipliers that have a bit width no greater than an input depth of the luma and chroma components.

The original algorithm shown in equations (1)-(3) and (7)-(22) can be modified to incorporate the newly introduced parameters. In an embodiment, avgY' and avgC use rounding functions, and predicted chroma samples (i.e., predSamples [x, y]) may be generated using filtered luma samples and reconstructed chroma samples via following equations and/or pseudo codes:

$p_Y'[x, -1] = (\text{recSamples}_L [2x - 1, -1] + 2 * \text{recSamples}_L [2x, -1] + \text{recSamples}_L [2x + 1, -1] + 2) >> 2$, with $x = 0..nS - 1$
$p_Y'[-1, y] = (\text{recSamples}_L [-1, 2y] + \text{recSamples}_L [-1, 2y + 1]) >> 1$, with $y = 0..nS - 1$
$p_Y'[x, y] = (\text{recSamples}_L [2x, 2y] + \text{recSamples}_L [2x, 2y + 1]) >> 1$, with $x, y = 0..nS - 1$
$k3 = \text{Max}(0, \text{BitDepth}_C + \log_2(nS) - 14)$  (39)

$$L = \left( \sum_{y=0}^{nS-1} p_Y'[-1, y] + \sum_{x=0}^{nS-1} p_Y'[x, -1] \right) >> k3 \quad (40)$$

$$C = \left( \sum_{y=0}^{nS-1} p[-1, y] + \sum_{x=0}^{nS-1} p[x, -1] \right) >> k3 \quad (41)$$

$$LL = \left( \sum_{y=0}^{nS-1} p_Y'[-1, y]^2 + \sum_{x=0}^{nS-1} p_Y'[x, -1]^2 \right) >> k3 \quad (42)$$

$$LC = \left( \sum_{y=0}^{nS-1} p_Y'[-1, y] * p[-1, y] + \sum_{y=0}^{nS-1} p_Y'[x, -1] * p[x, -1] \right) >> k3 \quad (43)$$

$k2 = \log_2((2 * nS) >> k3)$  (44)
$\text{avgY}' = (L + nS >> k3) >> k2$  (45)
$\text{RErrY}' = L - \text{avgY}' << k2$  (46)
$\text{avgC} = (C + nS >> k3) >> k2$  (47)
$\text{RErrC} = C - \text{avgC} << k2$  (48)
$a1 = LC - (2 * nS * \text{avgY}' * \text{avgC} + \text{avgY}' * \text{RErrC} + \text{avgC} * \text{RErrY}')$
$a2 = LL - (2 * nS * \text{avgY}'^2 + 2 * \text{avgY}' * \text{RErrY}')$
$k1 = \text{Max}(0, \log_2(\text{abs}(a2)) - 5) - \text{Max}(0, \log_2(\text{abs}(a1)) - 14) + 2$
...
$\text{beta} = \text{avgC} - ((\text{alpha} * \text{avgY}') >> k1)$
$\text{predSamples}[x, y] = \text{Clip1}_C(((p_Y'[x, y] * \text{alpha}) >> k) + \text{beta})$, with $x, y = 0..nS - 1$ In the above equations and/or pseudo codes, the derivation process of alpha, which is an integer version of a1/a2, may be completed using any viable algorithm. For example, the skipped part " . . . " may be completed using equations (16)-(20) above, wherein alpha=a. The skipped part may also be further simplified compared to the equations (16)-(20). As shown above, larger multipliers (e.g., L and C) of the original algorithm may not need to be multiplied anymore, larger subtractors (e.g., L*C and L*L) may be removed from the calculation. The signs of RErrY' and RErrC may be obtained along with their calculations (if avgY' and avgC uses rounding functions). As a result of the above simplifications, if the input bit depth of the luma and chroma components is N, wherein N is an integer greater than one, multipliers used in the calculation of a1 and a2 may have a maximum bit width of N. For example, if the input bit depth is 8, the original algorithm may require 13-bit multipliers (e.g., L and C), whereas the new algorithm may require no more than 8-bit multipliers to calculate a1 and a2. With the reduced bit number of multipliers, computation complexity of a disclosed LM may be simpler than the original algorithm. Further, a total number of mathematical operations may be reduced compared to the original algorithm.

Based on the equation (39), it can be seen that k3 may equal 0 or a positive integer, depending on the width (i.e., nS) and the input depth (i.e., $\text{BitDepth}_C$) of the chroma block. For example, when $4 \leq nS \leq 16$ and $\text{BitDepth}_C=10$, from equation (39) k3=0. In this case, C is an original sum (i.e., without shifting) of a plurality of reconstructed chroma samples located in neighboring blocks of the chroma block, L is an original sum of a plurality of filtered luma samples located in neighboring blocks of the corresponding luma block. In equation (45), a rounding function is applied to the average of the filtered luma samples. Specifically, the sum is divided by the total number of filtered luma samples via right shifting (>>), and then the division is converted to an integer that is closest to the division. Similarly, in equation (47) a rounding function is applied to the average of the reconstructed chroma samples. For another example, when 16=nS and $\text{BitDepth}_C>10$, from equation (39) k3>0. In this case, C is a right shifted sum, with the original sum being on a plurality of reconstructed chroma samples located in neighboring blocks of the chroma block. Similarly, L is a shifted sum of a plurality of filtered luma samples located in neighboring blocks of the corresponding luma block. In equation (45), a rounding function is applied to a shifted average of the filtered luma samples. Specifically, the shifted sum is divided by the total number of filtered luma samples via right shifting, and then the division is converted to an integer that is closest to the division. Similarly, in equation (47) a rounding function is applied to a shifted average of the reconstructed chroma samples. Thus, as described herein, it may be seen that a sum may be an original sum or a shifted sum, and an average may be an original average or a shifted average.

In an embodiment, avgY' and avgC may use flooring instead of rounding functions. In this case, equations (45)-(48) may be replaced by the following equations (49)-(52) respectively, while keeping other equations intact:

$\text{avg}Y'=L>>k2$  (49)

$\text{RErr}Y'=L\&((1<<k2)-1)$  (50)

$\text{avg}C=C>>k2$  (51)

$\text{RErr}C=C\&((1<<k2)-1)$  (52)

It should be noted that the equations, code, and/or pseudo code described herein may be implemented using any suitable coding or programming language, such as C/C++, Java, Perl, Python, Matlab, any other language, or any combination thereof. Further, intermediate variables used herein may or may not have a corresponding physical quantity. Notations of variables can be changed without departing from principles of the present disclosure. In implementation, if a second variable does not depend on a first variable, then the second variable may be computed before or after the first variable. Otherwise, if the second variable depends on the first variable, then the second variable is computed after the first variable. Moreover, there may be various algorithms to generate prediction chroma samples, which may use same or different intermediate variables (e.g., alpha denoted as a or any other notation, beta denoted as b or any other notation).

$$\begin{cases} RErrY' = \sum_{y=0}^{nS-1} \Delta p'_Y[-1, y] + \sum_{x=0}^{nS-1} \Delta p'_Y[x, -1] \\ RErrC = \sum_{y=0}^{nS-1} \Delta p[-1, y] + \sum_{x=0}^{nS-1} \Delta p[x, -1] \end{cases} \quad (55)$$

With introduction of parameters $\Delta p_Y'$ and $\Delta p$, calculations of a1' and a2' in equations (33) and (35) respectively may be rewritten as:

$$a1' = \frac{2*nS*\left(\sum_{y=0}^{nS-1} p'_Y[-1, y]*p[-1, y] + \sum_{y=0}^{nS-1} p'_Y[x, -1]*p[x, -1]\right)}{2^{2*k3}} - \qquad (56)$$

$$\frac{2*nS*(2*nS*avgY'*avgC + avgY'*RErrC + RErrY'*avgC)}{2^{2*k3}} =$$

$$\frac{2*nS*\left(\sum_{y=0}^{nS-1} (\Delta p'_Y[-1, y]*\Delta p[-1, y]) + \sum_{y=0}^{nS-1} (\Delta p'_Y[x, -1]*\Delta p[x, -1])\right)}{2^{2*k3}}$$

$$a2' = \frac{2*nS*\left(\sum_{y=0}^{nS-1} p'_Y[-1, y]^2 + \sum_{x=0}^{nS-1} p'_Y[x, -1]^2 - (2*nS*avgY'^2 + 2*avgY'*RErrY')\right)}{2^{2*k3}} = \qquad (57)$$

$$\frac{2*nS*\left(\sum_{y=0}^{nS-1} \Delta p'_Y[-1, y]^2 + \sum_{x=0}^{nS-1} \Delta p'_Y[x, -1]^2\right)}{2^{2*k3}}$$

As mentioned previously, there may also be a second approach of using parameters avgY' and avgC in computing predicted samples in the prediction block. In an embodiment of the second approach, two additional parameters or intermediate variables may be set as follows:

$$\begin{cases} \Delta p'_Y[-1, y] = p'_Y[-1, y] - avgY' \\ \Delta p'_Y[x, -1] = p'_Y[x, -1] - avgY' \end{cases} \quad (53)$$

$$\begin{cases} \Delta p[-1, y] = p[-1, y] - avgC \\ \Delta p[x, -1] = p[x, -1] - avgC \end{cases} \quad (54)$$

It can be seen that each parameter $\Delta P_Y'$ indicates a difference between a filtered luma sample in the top neighboring row or left neighboring column and the previously defined avgY'. Similarly, each $\Delta p$ indicates a difference between a filtered chroma sample in the top neighboring row or left neighboring column and the previously defined avgC. Whether avgY' and avgC use rounding or flooring functions, $\Delta p_Y'$ and $\Delta p$ may be signed bits. Further, a maximum bit width of $\Delta p_Y'$ and $\Delta p$ may be equal to an input depth of the luma and chroma components. Mathematically, the following equation can be derived:

Then, calculation of alpha' in equation (36) may be rewritten as follows:

$$\text{alpha}' = \frac{\sum_{y=0}^{nS-1} (\Delta p'_Y[-1, y]*\Delta p[-1, y]) + \sum_{y=0}^{nS-1} (\Delta p'_Y[x, -1]*\Delta p[x, -1])}{\sum_{y=0}^{nS-1} \Delta p'_Y[-1, y]^2 + \sum_{x=0}^{nS-1} \Delta p'_Y[x, -1]^2} \qquad (58)$$

Equation (58) indicates that multipliers $\Delta p_Y'$ and $\Delta p$ may all have a maximum bit width equal to an input bit depth of the luma and chroma components. For example, if the input bit depth is 8, no multiplier more than 8-bits may be needed to calculate alpha'. Note that since beta' is based on alpha', equation (38), may still be used to compute beta'.

Using the second approach, the original algorithm shown in equations (1)-(3) and (7)-(22) can be modified. In an embodiment, avgY' and avgC use rounding functions, and predicted chroma samples (i.e., predSamples[x, y]) may be generated using filtered luma samples and reconstructed chroma samples via following equations and/or pseudo codes:

$p_Y'[x, -1] = (\text{recSamples}_L[2x - 1, -1] + 2 * \text{recSamples}_L[2x, -1] + \text{recSamples}_L[2x + 1, -1] + 2) >> 2$, with $x = 0..nS - 1$ $p_Y'[-1, y] = (\text{recSamples}_L[-1, 2y] + \text{recSamples}_L[-1, 2y + 1]) >> 1$, with $y = 0..nS - 1$ -continued $p_Y'[x, y] = (\text{recSamples}_L[2x, 2y] + \text{recSamples}_L[2x, 2y + 1]) >> 1, \text{ with } x, y = 0..nS - 1$ $$avgY' = \left(\sum_{y=0}^{nS-1} p_Y'[-1, y] + \sum_{x=0}^{nS-1} p_Y'[x, -1] + (1 << (\log_2(2*nS) - 1))\right) >> \log_2(2*nS) \quad (59)$$

$$avgC = \left(\sum_{y=0}^{nS-1} p[-1, y] + \sum_{x=0}^{nS-1} p[x, -1] + (1 << (\log_2(2*nS) - 1))\right) >> \log_2(2*nS) \quad (60)$$

$\Delta p_Y'[-1, y] = p_Y'[-1, y] - avgY', \text{ with } y = 0..nS - 1$
$\Delta p_Y'[x, -1] = p_Y'[x, -1] - avgY', \text{ with } x = 0..nS - 1$
$\Delta p[-1, y] = p[-1, y] - avgC, \text{ with } y = 0..nS - 1$
$\Delta p[x, -1] = p[x, -1] - avgC, \text{ with } x = 0..nS - 1$ $$LL = \left(\sum_{y=0}^{nS-1} \Delta p_Y'[-1, y]^2 + \sum_{x=0}^{nS-1} \Delta p_Y'[x, -1]^2\right)$$

$$LC = \left(\sum_{y=0}^{nS-1} \Delta p_Y'[-1, y] * \Delta p[-1, y] + \sum_{y=0}^{nS-1} \Delta p_Y'[x, -1] * \Delta p[x, -1]\right)$$

$a1 = LC$
$a2 = LL$
$k1 = \text{Max}(0, \log_2(\text{abs}(a2)) - 5) - \text{Max}(0, \log_2(\text{abs}(a1)) - 14) + 2$
...
$beta = avgC - ((alpha * avgY') >> k1)$
$\text{predSamples}[x, y] = \text{Clip1}_C(((p_Y'[x, y] * alpha) >> k) + beta), \text{ with } x, y = 0..nS - 1$ In the above equations and/or pseudo codes, if avgY' and avgC use flooring instead of rounding functions, equations (59) and (60) may be replaced by equations (26) and (27) while keeping other equations intact. Further, the derivation process of alpha, which is an integer version of a1/a2, may be completed using any viable algorithm. For example, the skipped part " . . . " may be completed using equations (16)-(20) above, wherein alpha=a. The skipped part may also be further simplified compared to the equations (16)-(20). As shown above, larger multipliers (e.g., L and C) of the original algorithm may not be used anymore, larger subtractors (e.g., L*C and L*L) may be removed, and the parameters of k2 and k3 may not be necessary in calculation. Because the signs of $\Delta p_Y'$ and $\Delta p$ may be obtained along with their calculations, only 8 or 10-bit multipliers may be needed for the calculation of alpha. With the reduced bit number of multipliers and subtractors, computation complexity of the second approach may also be simpler than the original algorithm. Further, a total number of mathematical operations may be reduced compared to the original algorithm.

In an embodiment, another parameter or intermediate variable, denoted as LM_REDUCED_BIT, may be introduced to further simplify the LM mode. Based on equations (16) and (17) which may be used in the skipped part (i.e., " . . . ") of pseudo codes described above, a1s and a2s may be restricted to 5 bits and 14 bits respectively (when input depth is 8). Since a1s and a2s are derived from a1 and a2 respectively, which in turn are derived from LL and LC respectively, it may be desirable to further reduce bit widths of LL and LC.

The parameter LM_REDUCED_BIT may indicate a further reduced bit width, where LM_REDUCED_BIT is a non-negative integer. A LM_REDUCED_BIT value of zero may denote no further bit reduction, and a value of one may denote a right shift by one bit. Other values may be similarly defined. Using the parameter LM_REDUCED_BIT, expressions of avgY' and avgC (in case of rounding functions) may be modified as follows:

$$avgY' = \left(\sum_{y=0}^{nS-1} p_Y'[-1, y] + \sum_{x=0}^{nS-1} p_Y'[x, -1] + (1 << (\log_2(2*nS) + \text{LM\_REDUCED\_BIT} - 1))\right) >> (\log_2(2*nS) + \text{LM\_REDUCED\_BIT}) \quad (61)$$

$$avgC = \left(\sum_{y=0}^{nS-1} p[-1, y] + \sum_{x=0}^{nS-1} p[x, -1] + (1 << (\log_2(2*nS) + \text{LM\_REDUCED\_BIT} - 1))\right) >> (\log_2(2*nS) + \text{LM\_REDUCED\_BIT}) \quad (62)$$

Next, if $\Delta p_Y'$ and $\Delta p$ parameters are used in calculating predicted samples, an embodiment of the equations and/or pseudo code may be as follows, with x=0 . . . nS−1, y=0 . . . nS−1:

$\Delta p_Y'[-1, y] = ((p_Y'[-1, y] + (1 << (\text{LM\_REDUCED\_BIT} - 1))) >> \text{LM\_REDUCED\_BIT}) - avgY'$ (63)
$\Delta p_Y'[x, -1] = ((p_Y'[x, -1] + (1 << (\text{LM\_REDUCED\_BIT} - 1))) >> \text{LM\_REDUCED\_BIT}) - avgY'$ (64)
$\Delta p[-1, y] = ((p[-1, y] + (1 << (\text{LM\_REDUCED\_BIT} - 1))) >> \text{LM\_REDUCED\_BIT}) - avgC$ (65)
$\Delta p[x, -1] = ((p[x, -1] + (1 << (\text{LM\_REDUCED\_BIT} - 1))) >> \text{LM\_REDUCED\_BIT}) - avgC$ (66)

$$LL = \left(\sum_{y=0}^{nS-1} \Delta p'_Y[-1, y]^2 + \sum_{x=0}^{nS-1} \Delta p'_Y[x, -1]^2\right) \quad (67)$$

$$LC = \left(\sum_{y=0}^{nS-1} \Delta p'_Y[-1, y] * \Delta p[-1, y] + \sum_{y=0}^{nS-1} \Delta p'_Y[x, -1] * \Delta p[x, -1]\right) \quad (68)$$

a1 = LC  (69)
a2 = LL  (70)
k1 = Max(0, log$_2$(abs(a2)) − 5) − Max(0, log$_2$ (abs(a1)) − 14) + 2)  (71)
...
beta = (1 << (LM_REDUCED_BIT − 1)) * avgC − (((1 << (LM_REDUCED_BIT − 1)) * alpha * avgY') >> k1)  (72)
predSamples[x, y] = Clip1$_C$(((p$_Y$'[x, y] * alpha) >> k) + beta), with x, y = 0..nS − 1  (73)

In the above equations and/or pseudo codes, the derivation process of alpha, which is an integer version of a1/a2, may be completed using any viable algorithm. For example, the skipped part " . . . " may be completed using equations (16)-(20) above. With the use of LM_REDUCED_BIT−1, computation complexity of the LM mode may be further simplified. Note that other variations of the disclosed LM mode (e.g., flooring case) may also similarly use the parameter LM_REDUCED_BIT−1.

Although a 64-entry look-up table (e.g., Table 1) may be used in the above pseudo codes (in the skipped part of codes) to determine a value of 1 mDiv using a2s as an index, the look-up table may comprise less than 64 1 mDiv entries. Further, if desired, 1 mDiv may be determined via an equation instead of the look-up table.

While a YUV sampling rate of 4:2:0, as described above, may require filtering of reconstructed luma samples before using them as reference samples, other sampling rates may require no filtering or subsampling, or may have different filtering schemes. For example, in 4:4:4 sampling, each reconstructed luma sample may be used directly as reference samples, without any further filtering or downsampling. In this case, a current chroma block and its corresponding luma block has a same size of nS×nS (or 2 nS×2 nS if desired). Further, p$_Y$'[x, y]=recSamples$_L$[x, y] with x, y=−1 . . . nS−1. Alternatively, since no filtering is needed anymore, notation p$_Y$'[x, y] may simply be skipped, and recSamples$_L$[x, y] is used instead in following computations. For example, a flooring function of an average of reconstructed luma samples located in neighboring blocks of the corresponding reconstructed luma block may be computed as:

$$avgY' = \text{floor}\left(\frac{\sum_{y=0}^{nS-1} recSamples_L[-1, y] + \sum_{x=0}^{nS-1} recSamples_L[x, -1]}{2*nS}\right)$$

In an embodiment of LM mode with 4:4:4 coded blocks, predicted chroma samples may be generated using reconstructed luma and chroma samples via following equations and/or pseudo codes:

$$L = \left(\sum_{y=0}^{nS-1} recSamples_L[-1, y] + \sum_{x=0}^{nS-1} recSamples_L[x, -1]\right)$$

$$C = \left(\sum_{y=0}^{nS-1} p[-1, y] + \sum_{x=0}^{nS-1} p[x, -1]\right)$$

$$LL = \left(\sum_{y=0}^{nS-1} recSamples_L[-1, y]^2 + \sum_{x=0}^{nS-1} recSamples_L[x, -1]^2\right)$$

$$LC = \left(\sum_{y=0}^{nS-1} recSamples_L[-1, y] * p[-1, y] + \sum_{y=0}^{nS-1} recSamples_L[x, -1] * p[x, -1]\right)$$

k2 = log$_2$(2*nS)

avgY' = L >> k2

RErrY' = L &((1 << k2) − 1)

avgC = C >> k2

RErrC = C &((1 << k2) − 1)

a1 = LC − (2*nS*avgY'*avgC + avgY'*RErrC + avgC*RErrY')

a2 = LL − (2*nS*avgY'$^2$ + 2*avgY'*RErrY')

k1 = Max(0, log$_2$(abs(a2)) − 5) − Max(0, log$_2$(abs(a1)) − 14) + 2

...

beta = avgC − ((alpha*avgY') >> k1)

predSamples[x, y] = Clip1$_C$(((p$'_Y$[x, y] * alpha) >> k) + beta), with x, y = 0..nS−1

In the above pseudo code, a flooring function is used on the reconstructed luma and chroma samples. In the case of 4:4:4 sampling, although only one embodiment is shown as an example, one skilled in the art would recognize that other variations, e.g., using rounding functions instead of flooring functions, and/or using parameters Δp$_Y$' and Δp instead of RErrY' and RErrC, may be similarly implemented without departing from principles of the present disclosure. Thus, these variations will not be further described in the interest of conciseness.

In use, intra prediction in the LM mode using disclosed multipliers has be tested and compared with HEVC test model (HM) anchors. To evaluate coding performance after reducing bit widths of multipliers, simulations were performed under All Intra High Efficiency (HE) configuration. Testing results included the average percentage Bjontegaard Delta (BD) rates on a plurality of resolution classes (Classes A, B, C, D, E, and F) for the three components of color space (Y, U, and V), as well as encryption (Enc) and decryption (Dec) times. In the simulations, the BD rates of intra prediction using the disclosed LM mode were compared with the LM mode used in a HM 5.0 anchor in an encoder, which uses larger bit-width multipliers.

Table 2 shows relative performance of intra prediction using a disclosed algorithm in comparison to the HM 5.0 anchor in All Intra HE configuration. In this case, parameters avgY' and avgC used flooring functions and RErrY' and RErrC were used. Only 8 bit sequences in the class A were considered as defined by the common test condition. Results suggested that the average BD rates of the test case showed no change or small increases. For example, the average BD rate of A, B, C, D, and E classes remained the same for the V component and increased by 0.1% for the U component in All Intra HE. The BD rate of F class increased by 0.2% for the V component and remained the same for the V component. Further, in comparison to the HM 5.0 anchor, the encoding (Enc) and decoding (Dec) times of the test case decreased by 1% and 3% respectively, which indicated an improvement of coding speed.

TABLE 2

Testing result of disclosed algorithm vs. HM 5.0 anchor All Intra HE

| | All Intra HE | | |
|---|---|---|---|
| | Y | U | V |
| Class A (8bit) | 0.0% | 0.1% | 0.1% |
| Class B | 0.0% | 0.3% | 0.0% |
| Class C | 0.0% | 0.1% | 0.0% |
| Class D | 0.0% | 0.1% | 0.0% |
| Class E | 0.0% | 0.0% | 0.0% |
| Overall | 0.0% | 0.1% | 0.0% |
| | 0.0% | 0.1% | 0.0% |
| Class F | 0.0% | 0.0% | 0.2% |
| Enc Time [%] | | 99% | |
| Dec Time [%] | | 97% | |

Table 3 shows relative performance of intra prediction using a disclosed algorithm in comparison to the HM 5.0 anchor in All Intra HE 10 configuration. In this case, parameters avgY' and avgC used flooring functions and $\Delta p_y{'}$ and $\Delta p$ parameters were used. 10-bit sequences in the class A were considered as defined by the common test condition. Results suggested that the average BD rates of chroma components showed small increases. Further, in comparison to the HM 5.0 anchor, the encoding (Enc) time of the test case increased by 3%.

TABLE 3

Testing result of disclosed algorithm vs. HM 5.0 anchor All Intra HE10

| | All Intra HE10 | | |
|---|---|---|---|
| | Y | U | V |
| Class A | 0.0% | 0.2% | 0.2% |
| Class B | 0.0% | 0.1% | 0.0% |
| Class C | 0.0% | 0.0% | 0.1% |
| Class D | 0.0% | 0.0% | 0.0% |
| Class E | 0.0% | 0.0% | 0.0% |
| Overall | 0.0% | 0.1% | 0.0% |
| | 0.0% | 0.1% | 0.0% |
| Class F | 0.0% | 0.1% | 0.2% |

TABLE 3-continued

Testing result of disclosed algorithm vs. HM 5.0 anchor All Intra HE10

| | All Intra HE10 | | |
|---|---|---|---|
| | Y | U | V |
| Enc Time [%] | | 103% | |
| Dec Time [%] | | 100% | |

Table 4 shows relative performance of intra prediction using a disclosed algorithm in comparison to the HM 5.0 anchor in All Intra HE configuration. In this case, parameters avgY' and avgC used flooring functions and $\Delta p_y{'}$ and $\Delta p$ parameters were used. Parameter LM_REDUCED_BIT was set to one. Results suggested that the average BD rates of chroma components showed small decreases. Further, the encoding (Enc) time increased by 2% and the decoding (Dec) time decreased by 1%.

TABLE 4

Testing result of disclosed algorithm vs. HM 5.0 anchor All Intra HE with LM_REDUCED_BIT = 1

| | All Intra HE | | |
|---|---|---|---|
| | Y | U | V |
| Class A (8bit) | 0.0% | 0.1% | −0.1% |
| Class B | 0.0% | 0.3% | 0.1% |
| Class C | 0.0% | 0.0% | 0.1% |
| Class D | 0.0% | 0.2% | 0.0% |
| Class E | 0.0% | 0.2% | 0.4% |
| Overall | 0.0% | 0.2% | 0.1% |
| | 0.0% | 0.2% | 0.1% |
| Class F | 0.0% | −0.3% | −0.3% |
| Enc Time [%] | | 102% | |
| Dec Time [%] | | 99% | |

Table 5 shows relative performance of intra prediction using a disclosed algorithm in comparison to the HM 5.0 anchor in All Intra HE configuration. In this case, parameters avgY' and avgC used flooring functions and $\Delta p_y{'}$ and $\Delta p$ parameters were used. Parameter LM_REDUCED_BIT was set to two. Results suggested that the average BD rates of chroma components showed small increases. Further, the encoding (Enc) time remained the same and the decoding (Dec) time decreased by 4%.

TABLE 5

Testing result of disclosed algorithm vs. HM 5.0 anchor All Intra HE with LM_REDUCED_BIT = 2

| | All Intra HE | | |
|---|---|---|---|
| | Y | U | V |
| Class A (8bit) | 0.1% | 0.6% | −0.1% |
| Class B | 0.1% | 1.2% | 0.4% |
| Class C | 0.1% | 0.6% | 0.7% |
| Class D | 0.1% | 0.4% | 0.3% |
| Class E | 0.0% | 0.9% | 0.7% |
| Overall | 0.1% | 0.8% | 0.4% |
| | 0.1% | 0.8% | 0.4% |
| Class F | 0.1% | 0.2% | 0.2% |
| Enc Time [%] | | 100% | |
| Dec Time [%] | | 96% | |

Based on Tables 4 and 5, it may be seen that there were some coding losses when LM_REDUCED_BIT was set to one or two. Reducing 2 bits showed larger coding loss but with more complexity reduction. In practice, setting LM_REDUCED_BIT=0 (no bit reduction) or LM_REDUCED_BIT=1 may present a good tradeoff between complexity and performance.

Figure 3:
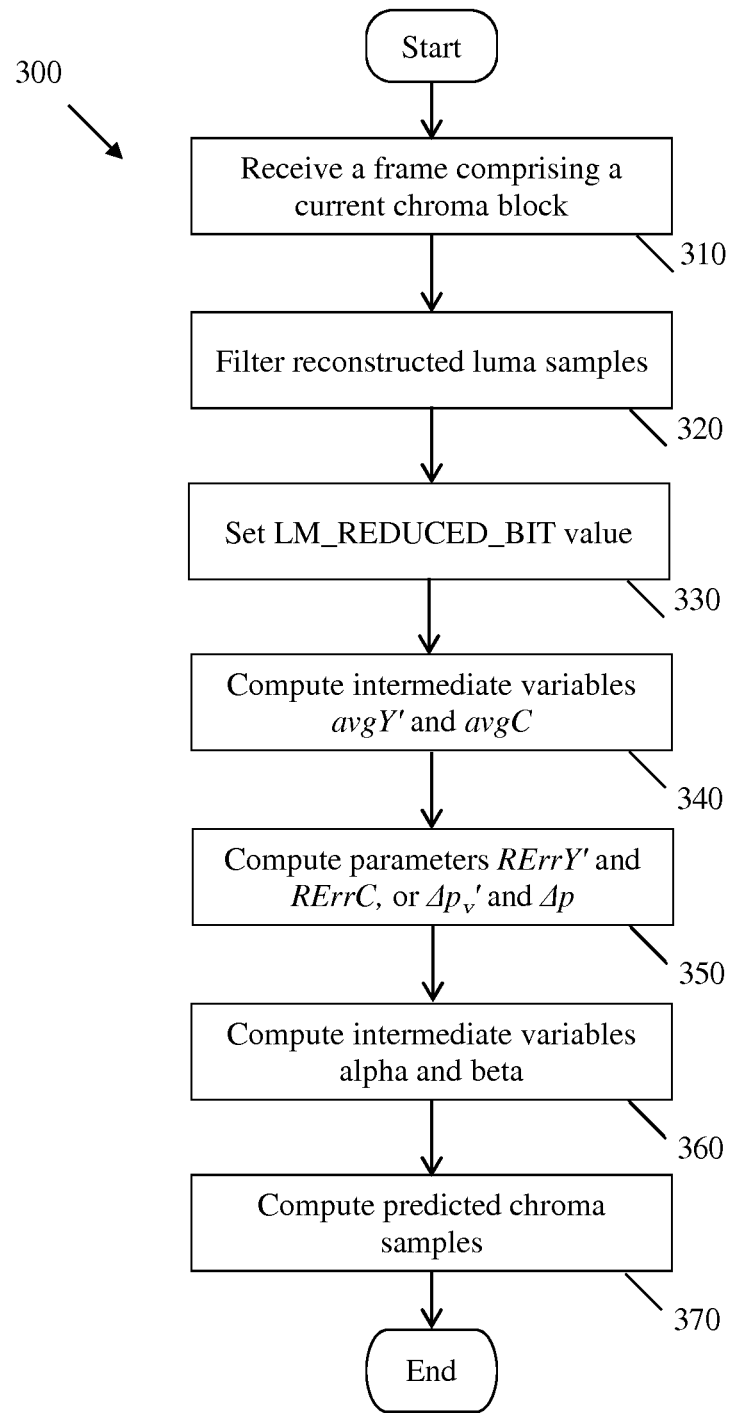
FIG. 3 is a flowchart of an embodiment of an intra prediction method in a disclosed linear method (LM) mode.

FIG. 3 is a flowchart of an intra prediction method 300 using a disclosed LM mode. The method 300 may be implemented in a video codec (e.g., the video encoder 100 in FIG. 1 or the video decoder 200 in FIG. 2). The method 300 starts in step 310, where a video frame or slice comprising a current chroma block may be received. The video frame may also comprise already-coded blocks including a reconstructed luma block corresponding to the current chroma block, reconstructed luma samples neighboring the corresponding luma block, and reconstructed chroma sample neighboring the current chroma block. The corresponding luma block comprises a plurality of reconstructed luma samples.

Next, in step 320, the reconstructed luma samples may be filtered or downsampled to generate filtered luma samples, which will then be used as reference samples. After filtering, a width of the corresponding reconstructed luma block may be reduced by half, which equals a width of the current chroma block. Filtering or downsampling of the luma component may be needed in, e.g., a sampling rate of 4:2:0. In other sampling rates, such as 4:4:4, reconstructed luma samples may be directly used as reference samples without any filtering or downsampling. In this case, step 320 may be skipped. In step 330, parameter LM_REDUCED_BIT may be set to a desired value. For example, LM_REDUCED_BIT may be set to 1 or 2. The setting of LM_REDUCED_BIT may be optional, thus in some codecs parameter LM_REDUCED_BIT may not be present. In this case, step 330 may be skipped.

Next, in step 340, intermediate variables avgY' and avgC may be computed. Integer rounding or flooring functions may be applied on an average of the filtered neighboring luma samples and on an average of the reconstructed neighboring chroma samples to obtain avgY' and avgC respectively. If LM_REDUCED_BIT was set before, computation of avgY' and avgC may also be influenced. The intermediate variables may be computed using equations and/or pseudo code presented herein. Next, in step 350, parameters or intermediate variables RErrY' and RErrC, or $\Delta p_Y'$ and $\Delta p$ may be computed. The choice of RErrY' and RErrC, or $\Delta p_Y'$ and $\Delta p$ may be pre-configured and application-dependent.

Next, in step 360, more intermediate variables including alpha (sometimes denoted as a) and beta (sometimes denoted as b) may be computed based on previously computed intermediate variables. Computation of alpha and beta may include determining of 1 mDiv values, which may be based on an 1 mDiv look-up table or an equation. Next, in step 370, predicted chroma samples may be computed based on computed alpha and beta values, which serve as linear coefficients applied onto the filtered luma samples located in the corresponding luma block. The predicted chroma samples make up the prediction block of the current chroma block.

It should be understood that the method 300 may include only a portion of intermediate variables needed to complete the LM mode, thus other intermediate variables, such as k1, a1, a2, etc., may also be incorporated into the intra prediction process wherever appropriate. Notations of intermediate variables may be changed without departing from principles of the disclosed LM mode. Moreover, the execution order or sequence of steps may be flexibly changed, e.g., if a step does not depend on a preceding step. For example, since step 330 may not depend on step 320 or 310, it may be moved ahead of those steps if so desired.

Figure 4:
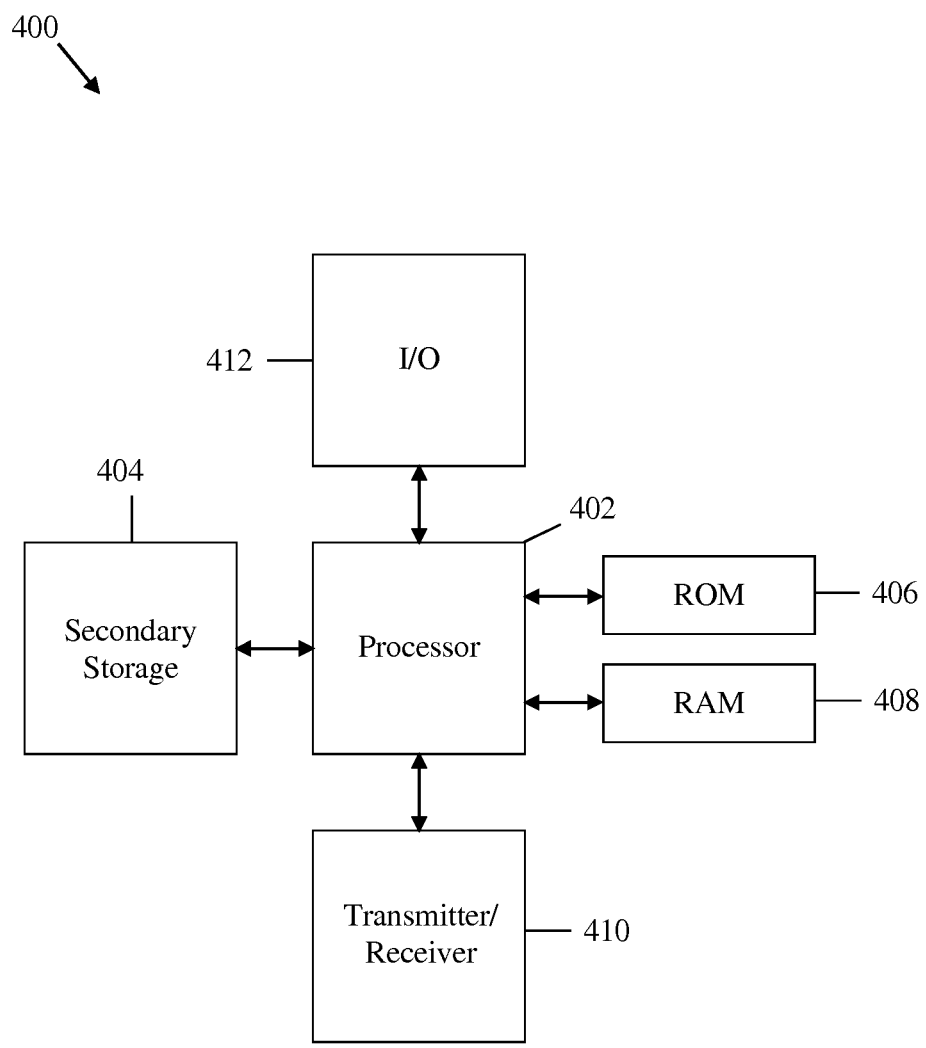
FIG. 4 is a schematic diagram of a general purpose computer system.

The schemes described above may be implemented on any general-purpose computer system, such as a computer or network component with sufficient processing power, memory resources, and network throughput capability to handle the necessary workload placed upon it. FIG. 4 illustrates a schematic diagram of a general-purpose computer system 400 suitable for implementing one or more embodiments of the methods disclosed herein, such as the video encoder 100, the video decoder 200, and the intra prediction method 300. The computer system 400 includes a processor 402 (which may be referred to as a central processor unit or CPU) that is in communication with memory devices including secondary storage 404, read only memory (ROM) 406, random access memory (RAM) 408, transmitter/receiver 410, and input/output (I/O) device 412. Although illustrated as a single processor, the processor 402 is not so limited and may comprise multiple processors. The processor 402 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 402 may be configured to implement any of the schemes, including implementation of pseudo code, described herein, such as the video encoder 100, the video decoder 200, and the intra prediction method 300. The processor 402 may be implemented using hardware, software, or both.

The secondary storage 404 is typically comprised of one or more disk drives or tape drives and is used for non-volatile storage of data and as an over-flow data storage device if the RAM 408 is not large enough to hold all working data. The secondary storage 404 may be used to store programs that are loaded into the RAM 408 when such programs are selected for execution. The ROM 406 is used to store instructions and perhaps data that are read during program execution. The ROM 406 is a non-volatile memory device that typically has a small memory capacity relative to the larger memory capacity of the secondary storage 404. The RAM 408 is used to store volatile data and perhaps to store instructions. Access to both the ROM 406 and the RAM 408 is typically faster than to the secondary storage 404.

The transmitter/receiver 410 may serve as an output and/or input device of the video codec 400. For example, if the transmitter/receiver 410 is acting as a transmitter, it may transmit data out of the computer system 400. If the transmitter/receiver 410 is acting as a receiver, it may receive data into the computer system 400. The transmitter/receiver 410 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices may enable the processor 402 to communicate with an Internet or one or more intranets.

I/O devices 412 may include a video monitor, liquid crystal display (LCD), touch screen display, or other type of video display for displaying video, and may also include a video recording device for capturing video. I/O devices 412 may also include one or more keyboards, mice, or track balls, or other well-known input devices.

It is understood that by programming and/or loading executable instructions onto the computer system 400, at least one of the processor 402, the RAM 408, and the ROM 406 are changed, transforming the computer system 400 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec comprising:
   a prediction module;
   a processor coupled to the prediction module, wherein the processor is configured to:
     compute an average of a plurality of reconstructed chroma samples located in neighboring blocks of a chroma block and adjacent to the chroma block;
     compute an intermediate variable by applying an integer function on the average of the reconstructed chroma samples, wherein the integer function is selected from a group consisting of a rounding function, a ceiling function, and a flooring function;
     generate a predicted chroma sample for the chroma block based on the intermediate variable; and
     communicate the predicted chroma sample to the prediction module,
   wherein the prediction module is configured to generate a prediction block comprising a plurality of predicted chroma samples,
   wherein the intermediate variable is a first intermediate variable denoted as avgC,
   wherein the processor is further configured to compute a second intermediate variable representing a difference between a sum of the plurality of reconstructed chroma samples and 2*nS*avgC,
   wherein nS denotes a width of the chroma block,
   wherein a number of the reconstructed chroma samples equals 2*nS, and
   wherein generating the predicted chroma sample is further based on the second intermediate variable.

2. The video codec of claim 1, wherein the processor is further configured to:
   generate a first plurality of filtered luma samples by filtering a first plurality of reconstructed luma samples located in a corresponding reconstructed luma block;
   generate a second plurality of filtered luma samples by filtering a second plurality of reconstructed luma samples located in neighboring blocks of the corresponding reconstructed luma block and adjacent to the corresponding reconstructed luma block;
compute an average of the second plurality of filtered luma samples; and
compute a third intermediate variable by applying the integer function on the average of the second plurality of filtered luma samples,
wherein generating the predicted chroma sample is further based on the third intermediate variable.

3. The video codec of claim 2, wherein the processor is further configured to compute a fourth intermediate variable representing a difference between a sum of the second plurality of filtered luma samples and 2*nS*avgY', wherein both a width of the corresponding reconstructed luma block and a number of the second plurality of filtered luma samples equal 2*nS, wherein avgY' denotes the third intermediate variable, and wherein generating the predicted chroma sample is further based on the fourth intermediate variable.

4. The video codec of claim 3, wherein computing the average of the reconstructed chroma samples comprises selectively right shifting the sum of the reconstructed chroma samples by a number of bits, wherein computing the average of the second plurality of filtered luma samples comprises selectively right shifting the sum of the second plurality of filtered luma samples by the number of bits, and wherein the number of bits is determined by nS and an input bit depth of the chroma block.

5. The video codec of claim 3, wherein the processor is further configured to:
compute an intermediate variable denoted as a1 based on the first, second, third, and fourth intermediate variables;
compute an intermediate variable denoted as a2 based on the third and fourth intermediate variables, wherein computing a1 and a2 uses no multiplier that has a bit width greater than an input bit depth of the chroma block; and
compute an integer division of a1 and a2 to generate an intermediate variable denoted as alpha,
wherein generating the predicted chroma sample is further based on alpha.

6. The video codec of claim 3, wherein the second and fourth intermediate variables are denoted as RErrC and RErrY' respectively, wherein each of the first plurality of filtered luma samples is denoted as $p_Y'[x, y]$ with x and y being position indexes, wherein an input bit depth of the chroma block is denoted as $BitDepth_C$, wherein the processor is further configured to compute additional intermediate variables denoted as a1, a2, k, k1, alpha, and beta according to the following equations:

$$a1 = LC - (2*nS*avgY'*avgC + avgY'*RErrC + avgC*RErrY');$$

$$a2 = LL - (2*nS*avgY'^2 + 2*avgY'*RErrY');$$

$$k1 = \text{Max}(0, \log_2(\text{abs}(a2)) - 5) - \text{Max}(0, \log_2(\text{abs}(a1)) - 14) + 2;$$

$$k = 13 - \text{Max}(0, \log_2(\text{abs}(\text{alpha})) - 6); \text{ and}$$

$$beta = avgC - ((\text{alpha}*avgY') >> k1),$$

wherein LC and LL are determined by the plurality of reconstructed chroma samples and the second plurality of filtered luma samples, wherein alpha is an integer division of a1 and a2, and wherein generating the predicted chroma sample, denoted as predSamples[x, y], uses equation:

$$predSamples[x,y] = Clip1_C(((p_Y'[x,y]*\text{alpha}) >> k) + beta), \text{ with } x, y = 0 \ldots nS-1,$$

where function Clip1C(x) is defined as:

$$Clip1_C(x) = Clip3(0, (1 << BitDepth_C) - 1, x),$$

where function Clip3(x, y, z) is defined as:

$$Clip3(x, y, z) = \begin{cases} x; & z < x \\ y; & z > y \\ z; & \text{otherwise.} \end{cases}$$

7. The video codec of claim 6, wherein the processor is further configured to determine LL and LC via either equations:

$$k3 = \text{Max}(0, BitDepth_C + \log_2(nS) - 14);$$

$$LL = \left( \sum_{y=0}^{nS-1} p_Y'[-1, y]^2 + \sum_{x=0}^{nS-1} p_Y'[x, -1]^2 \right) >> k3;$$

and $$LC = \left( \sum_{y=0}^{nS-1} p_Y'[-1, y] * p[-1, y] + \sum_{y=0}^{nS-1} p_Y'[x, -1] * p[x, -1] \right) >> k3$$

or equations:

$$LL = \left( \sum_{y=0}^{nS-1} p_Y'[-1, y]^2 + \sum_{x=0}^{nS-1} p_Y'[x, -1]^2 \right);$$

and $$LC = \left( \sum_{y=0}^{nS-1} p_Y'[-1, y] * p[-1, y] + \sum_{y=0}^{nS-1} p_Y'[x, -1] * p[x, -1] \right).$$

8. The video codec of claim 3, wherein the processor is further configured to set a parameter denoted as LM_REDUCED_BIT, and wherein avgY' and avgC are computed according to the following equations:

$$avgY' = \left( \sum_{y=0}^{nS-1} p_Y'[-1, y] + \sum_{x=0}^{nS-1} p_Y'[x, -1] + \right.$$

$$\left. (1 << (\log_2(2*nS) + LM\_REDUCED\_BIT - 1)) \right) >>$$

$$(\log_2(2*nS) + LM\_REDUCED\_BIT);$$

and $$avgC = \left( \sum_{y=0}^{nS-1} p[-1, y] + \sum_{x=0}^{nS-1} p[x, -1] + \right.$$

$$\left. (1 << (\log_2(2*nS) + LM\_REDUCED\_BIT - 1)) \right) >>$$

$$(\log_2(2*nS) + LM\_REDUCED\_BIT).$$

9. The video codec of claim 3, wherein an input bit depth of the chroma block is between 8 and 10, and wherein the width of the chroma block is no less than 4 and no greater than 32.

10. The video codec of claim 1, wherein the processor is further configured to:
compute an average of a plurality of reconstructed luma samples located in neighboring blocks of a corresponding reconstructed luma block and adjacent to the corresponding reconstructed luma block;

compute a fifth intermediate variable, denoted as avgY, by applying the integer function on the average of the plurality of reconstructed luma samples; and compute a sixth intermediate variable representing a difference between a sum of the plurality of reconstructed luma samples and 2*nS*avgY, wherein a width of the corresponding reconstructed luma block equals nS, and wherein generating the predicted chroma sample is further based on the sixth intermediate variable.

11. The video codec of claim 10, wherein the processor is further configured to:

compute an intermediate variable denoted as a1 based on the first, second, fifth, and sixth intermediate variables;

compute an intermediate variable denoted as a2 based on the fifth and sixth intermediate variables, wherein computing a1 and a2 uses no multiplier that has a bit width greater than an input bit depth of the chroma block; and compute an integer division of a1 and a2 to generate an intermediate variable denoted as alpha, wherein generating the predicted chroma sample is further based on alpha.

12. The video codec of claim 1, wherein the processor is further configured to compute a difference, denoted as Δp, between each of the plurality of reconstructed chroma samples and the intermediate variable, and wherein generating the predicted chroma sample is further based on the difference.

13. The video codec of claim 12, wherein the processor is further configured to:

compute an average of a plurality of luma samples located in neighboring blocks of a corresponding reconstructed luma block and adjacent to the corresponding reconstructed luma block;

compute a second intermediate variable by applying the integer function on the average of the plurality of luma samples; and compute a third intermediate variable to represent a difference between the second intermediate and each of the plurality of luma samples, wherein generating the predicted chroma sample is further based on the third intermediate variable.

14. The video codec of claim 1, wherein the processor is further configured to:

generate a residual block indicating a difference between the chroma block and a prediction block; and entropy encode the residual block to generate an encoded residual block.

15. The video codec of claim 1, wherein the processor is further configured to:

decode an encoded residual block to generate a decoded residual block; and combine the decoded residual block and a prediction block to generate the chroma block.

16. A method of video coding comprising:

computing, by a processor, an average of a plurality of reconstructed chroma samples located in neighboring blocks of a chroma block and adjacent to the chroma block;

computing, by the processor, an intermediate variable by applying an integer function on the average of the reconstructed chroma samples, wherein the integer function is selected from a group consisting of a rounding function and a flooring function;

generating, by the processor, a predicted chroma sample for the chroma block based on the intermediate variable;

communicating, by the processor, the predicted chroma sample to a prediction module; and generating, by the prediction module, a prediction block comprising a plurality of predicted chroma samples, wherein the intermediate variable is a first intermediate variable denoted as avgC, the method further comprising computing a second intermediate variable representing a difference between a sum of the plurality of reconstructed chroma samples and 2*nS*avgC, wherein nS denotes a width of the chroma block, wherein a number of the reconstructed chroma samples equals 2*nS, and wherein generating the predicted chroma sample is further based on the second intermediate variable.

17. The method of claim 16, further comprising:

generating a first plurality of filtered luma samples by filtering a first plurality of reconstructed luma samples located in a corresponding reconstructed luma block;

generating a second plurality of filtered luma samples by filtering a second plurality of reconstructed luma samples located in neighboring blocks of the corresponding reconstructed luma block and adjacent to the corresponding reconstructed luma block;

computing an average of the second plurality of filtered luma samples; and computing a third intermediate variable by applying the integer function on the average of the second plurality of filtered luma samples, wherein generating the predicted chroma sample is further based on the third intermediate variable.

18. The method of claim 17, further comprising computing a fourth intermediate variable representing a difference between a sum of the second plurality of filtered luma samples and 2*nS*avgY', wherein both a width of the corresponding reconstructed luma block and a number of the second plurality of filtered luma samples equal 2*nS, wherein avgY' denotes the third intermediate variable, and wherein generating the predicted chroma sample is further based on the fourth intermediate variable.

19. The method of claim 18, wherein computing the average of the reconstructed chroma samples comprises selectively right shifting the sum of the reconstructed chroma samples by a number of bits, wherein computing the average of the second plurality of filtered luma samples comprises selectively right shifting the sum of the second plurality of filtered luma samples by the number of bits, and wherein the number of bits is determined by nS and an input bit depth of the chroma block.

20. The method of claim 18, further comprising:

computing an intermediate variable denoted as a1 based on the first, second, third, and fourth intermediate variables;

computing an intermediate variable denoted as a2 based on the third and fourth intermediate variables, wherein computing a1 and a2 uses no multiplier that has a bit width greater than an input bit depth of the chroma block; and computing an integer division of a1 and a2 to generate an intermediate variable denoted as alpha, wherein generating the predicted chroma sample is further based on alpha.

21. The method of claim 18, further comprising setting a parameter denoted as LM_REDUCED_BIT, wherein avgY' and avgC are computed according to the following equations:

$$avgY' = \left(\sum_{y=0}^{nS-1} p'_Y[-1, y] + \sum_{x=0}^{nS-1} p'_Y[x, -1] + \right.$$
$$\left. (1 << (\log_2(2*nS) + \text{LM\_REDUCED\_BIT} - 1))\right) >>$$
$$(\log_2(2*nS) + \text{LM\_REDUCED\_BIT});$$

and $$avgC = \left(\sum_{y=0}^{nS-1} p[-1, y] + \sum_{x=0}^{nS-1} p[x, -1] + \right.$$
$$\left. (1 << (\log_2(2*nS) + \text{LM\_REDUCED\_BIT} - 1))\right) >>$$
$$(\log_2(2*nS) + \text{LM\_REDUCED\_BIT}).$$

22. The method of claim 16, further comprising:
computing an average of a plurality of reconstructed luma samples located in neighboring blocks of a corresponding reconstructed luma block and adjacent to the corresponding reconstructed luma block;
computing a fifth intermediate variable, denoted as avgY, by applying the integer function on the average of the plurality of reconstructed luma samples; and
computing a sixth intermediate variable representing a difference between a sum of the plurality of reconstructed luma samples and 2*nS*avgY, wherein a width of the corresponding reconstructed luma block equals nS,
wherein generating the predicted chroma sample is further based on the sixth intermediate variable.

23. The method of claim 16, further comprising:
computing a difference, denoted as Δp, between each of the plurality of reconstructed chroma samples and the intermediate variable;
computing an average of a plurality of luma samples located in neighboring blocks of a corresponding reconstructed luma block and adjacent to the corresponding reconstructed luma block;
computing a second intermediate variable by applying the integer function on the average of the plurality of luma samples; and
computing a third intermediate variable to represent a difference between the second intermediate and each of the plurality of luma samples,
wherein generating the predicted chroma sample is further based on Δp and the third intermediate variable.

24. An apparatus comprising:
a prediction module;
a processor coupled to the prediction module, wherein the processor is configured to:
generate a prediction block for a chroma block, wherein the prediction block comprises a predicted chroma sample, and wherein generating the prediction block comprises:
computing a sum of a plurality of reconstructed chroma samples located in neighboring blocks of the chroma block and adjacent to the chroma block;
computing an intermediate variable based on the sum and using an integer function selectable from the group consisting of a rounding function and a flooring function;
generating a predicted chroma sample in the prediction block using the intermediate variable; and
communicating the predicted chroma sample to the prediction module,
wherein the prediction module is configured to generate a prediction block comprising a plurality of predicted chroma samples,
wherein, when a second intermediate variable depending on a size and an input bit depth of the chroma block is zero, computing the intermediate variable comprises:
computing an average of the plurality of reconstructed chroma samples from the sum; and
applying the integer function on the average;
wherein, when the second intermediate variable depending on the size and the input bit depth of the chroma block is non-zero, computing the intermediate variable comprises:
right shifting the sum to generate a shifted sum;
computing an average value from the shifted sum; and
applying the integer function on the average value.

* * * * *

UNITED STATES PATENT AND TRADEMARK OFFICE
CERTIFICATE OF CORRECTION

PATENT NO.         : 9,225,984 B2
APPLICATION NO.    : 13/749439
DATED              : December 29, 2015
INVENTOR(S)        : Lingzhi Liu Page 1 of 2

It is certified that error appears in the above-identified patent and that said Letters Patent is hereby corrected as shown below:

In the claims:

Column 32, Lines 12-34, Claim 7, should read as:
7. The video codec of claim 6, wherein the processor is further configured to determine LL and LC via either equations:

$$k3 = \text{Max}(0, \text{BitDepth}_C + \log_2(nS) - 14);$$

$$LL = \left( \sum_{y=0}^{nS-1} p_Y'[-1, y]^2 + \sum_{x=0}^{nS-1} p_Y'[x, -1]^2 \right) >> k3; \text{ and}$$

$$LC = \left( \sum_{y=0}^{nS-1} p_Y'[-1, y] * p[-1, y] + \sum_{y=0}^{nS-1} p_Y'[x, -1] * p[x, -1] \right) >> k3$$

or equations:

$$LL = \left( \sum_{y=0}^{nS-1} p_Y'[-1, y]^2 + \sum_{x=0}^{nS-1} p_Y'[x, -1]^2 \right); \text{ and}$$

$$LC = \left( \sum_{y=0}^{nS-1} p_Y'[-1, y] * p[-1, y] + \sum_{y=0}^{nS-1} p_Y'[x, -1] * p[x, -1] \right).$$

Signed and Sealed this
Twelfth Day of April, 2016

Michelle K. Lee
*Director of the United States Patent and Trademark Office*

CERTIFICATE OF CORRECTION (continued)
U.S. Pat. No. 9,225,984 B2

In the claims:

Column 32, Lines 36-56, Claim 8, should read as:
8. The video codec of claim 3, wherein the processor is further configured to set a parameter denoted as LM_REDUCED_BIT, and wherein avgY' and avgC are computed according to the following equations:

$$avgY' = \left( \sum_{y=0}^{nS-1} p_Y'[-1, y] + \sum_{x=0}^{nS-1} p_Y'[x, -1] + (1 << (\log_2(2*nS) + LM\_REDUCED\_BIT - 1)) \right)$$
$$>> (\log_2(2*nS) + LM\_REDUCED\_BIT); \text{ and}$$

$$avgC = \left( \sum_{y=0}^{nS-1} p[-1, y] + \sum_{x=0}^{nS-1} p[x, -1] + (1 << (\log_2(2*nS) + LM\_REDUCED\_BIT - 1)) \right)$$
$$>> (\log_2(2*nS) + LM\_REDUCED\_BIT).$$

Column 34, Lines 65-67, through Column 35, Lines 1-16, Claim 21, should read as:
21. The method of claim 18, further comprising setting a parameter denoted as LM_REDUCED_BIT, wherein avgY' and avgC are computed according to the following equations:

$$avgY' = \left( \sum_{y=0}^{nS-1} p_Y'[-1, y] + \sum_{x=0}^{nS-1} p_Y'[x, -1] + (1 << (\log_2(2*nS) + LM\_REDUCED\_BIT - 1)) \right)$$
$$>> (\log_2(2*nS) + LM\_REDUCED\_BIT); \text{ and}$$

$$avgC = \left( \sum_{y=0}^{nS-1} p[-1, y] + \sum_{x=0}^{nS-1} p[x, -1] + (1 << (\log_2(2*nS) + LM\_REDUCED\_BIT - 1)) \right)$$
$$>> (\log_2(2*nS) + LM\_REDUCED\_BIT).$$